United States Patent
Haga et al.

(10) Patent No.: US 11,225,701 B2
(45) Date of Patent: Jan. 18, 2022

(54) HOT DIP GALVANIZED STEEL SHEET AND HOT DIP GALVANNEALED STEEL SHEET

(71) Applicant: NIPPON STEEL CORPORATION, Tokyo (JP)

(72) Inventors: Jun Haga, Tokyo (JP); Kohichi Sano, Tokyo (JP); Koutarou Hayashi, Tokyo (JP); Kunio Hayashi, Tokyo (JP); Masaharu Kameda, Tokyo (JP); Akihiro Uenishi, Tokyo (JP); Hiroyuki Kawata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/043,267

(22) PCT Filed: Mar. 30, 2018

(86) PCT No.: PCT/JP2018/013915
§ 371 (c)(1),
(2) Date: Sep. 29, 2020

(87) PCT Pub. No.: WO2019/187124
PCT Pub. Date: Oct. 3, 2019

(65) Prior Publication Data
US 2021/0017622 A1    Jan. 21, 2021

(51) Int. Cl.
*C21D 6/00* (2006.01)
*C21D 9/46* (2006.01)
*B32B 15/01* (2006.01)
*C22C 38/38* (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01); *B32B 15/18* (2013.01); *C21D 6/002* (2013.01); *C21D 6/005* (2013.01); *C21D 6/008* (2013.01); *C21D 8/005* (2013.01); *C21D 8/0205* (2013.01); *C21D 8/0221* (2013.01); *C21D 8/0226* (2013.01); *C21D 8/0231* (2013.01); *C21D 8/0236* (2013.01); *C21D 8/0247* (2013.01); *C21D 8/0268* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/38* (2013.01); *C22C 38/40* (2013.01); *C22C 38/42* (2013.01);
(Continued)

(58) Field of Classification Search
CPC ........ C21D 2211/001; C21D 2211/008; C21D 6/002; C21D 6/005; C21D 6/008; C21D 9/46; C21D 8/0247; C21D 8/0205; C21D 8/005; C21D 8/0221; C21D 8/0226; C21D 8/0231; C21D 8/0236; C21D 8/0268; C22C 38/42; C22C 38/48; C22C 38/46; C22C 38/44; C22C 38/00; C22C 38/58; C22C 38/54; C22C 38/001; C22C 38/002; C22C 38/005; C22C 38/02; C22C 38/06; C22C 38/08; C22C 38/14; C22C 38/16; C22C 38/22; C22C 38/32; C22C 38/38; C22C 38/04; C22C 38/12; C22C 38/18; C22C 38/20; C22C 38/24; C22C 38/26; C22C 38/28; C22C 38/34; C22C 38/40; B32B 15/013; B32B 15/04; B32B 15/043; B32B 15/18; C23C 2/02; C23C 2/06; C23C 2/28; C23C 2/40; C23C 30/00; C23C 30/005; C23C 28/3225; C23C 28/025; Y10T 428/12799; Y10T 428/12951; Y10T 428/12958; Y10T 428/12965; Y10T 428/12972; Y10T 428/12979

See application file for complete search history.

(56) References Cited

U.S. PATENT DOCUMENTS

| 2011/0005643 A1* | 1/2011 | Murakami ............... C21D 1/25 148/331 |
| 2014/0242414 A1 | 8/2014 | Minami et al. |

FOREIGN PATENT DOCUMENTS

| CN | 103703157 A | 4/2014 |
| JP | 61-157625 A | 7/1986 |
| JP | 61-217529 A | 9/1986 |
| JP | 11-279691 A | 10/1999 |
| JP | 2001-192768 A | 7/2001 |
| JP | 2017-53001 A | 3/2017 |

* cited by examiner

Primary Examiner — Michael E. La Villa
(74) Attorney, Agent, or Firm — Birch, Stewart, Kolasch & Birch, LLP

(57) ABSTRACT

A hot dip galvanized steel sheet and hot dip galvannealed steel sheet improved in uniform ductility and local ductility, yield strength and tensile strength, and low temperature impact property, characterized by having a predetermined chemical composition, having a metal structure containing, by volume %, retained austenite: over 5.0% and tempered martensite: over 5.0%, having retained austenite containing C: 0.85 mass % or more, and having a ratio $[C]_{\gamma gb}/[P]_{\gamma gb}$ of an amount of segregation of C (number of atoms/nm$^2$): $[C]_{\gamma gb}$ to an amount of segregation of P (number of atoms/nm$^2$): $[P]_{\gamma gb}$ at prior austenite grain boundaries of 4.0 or more.

10 Claims, No Drawings

(51) Int. Cl.
*C22C 38/32* (2006.01)
*C22C 38/22* (2006.01)
*C22C 38/16* (2006.01)
*C22C 38/14* (2006.01)
*C22C 38/08* (2006.01)
*C22C 38/06* (2006.01)
*C22C 38/02* (2006.01)
*C22C 38/00* (2006.01)
*C23C 2/02* (2006.01)
*C23C 2/06* (2006.01)
*C23C 2/28* (2006.01)
*C23C 2/40* (2006.01)
*C22C 38/58* (2006.01)
*C22C 38/54* (2006.01)
*C22C 38/50* (2006.01)
*C22C 38/48* (2006.01)
*C22C 38/46* (2006.01)
*C22C 38/44* (2006.01)
*C22C 38/42* (2006.01)
*C21D 8/02* (2006.01)
*C22C 38/26* (2006.01)
*B32B 15/04* (2006.01)
*C23C 30/00* (2006.01)
*C22C 38/34* (2006.01)
*C22C 38/24* (2006.01)
*C23C 28/00* (2006.01)
*C22C 38/12* (2006.01)
*C23C 28/02* (2006.01)
*C22C 38/20* (2006.01)
*C22C 38/18* (2006.01)
*C22C 38/40* (2006.01)
*C22C 38/28* (2006.01)
*C22C 38/04* (2006.01)
*C21D 8/00* (2006.01)
*B32B 15/18* (2006.01)

(52) U.S. Cl.
CPC .............. *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/06* (2013.01); *C23C 2/28* (2013.01); *C23C 2/40* (2013.01); *C23C 28/025* (2013.01); *C23C 28/3225* (2013.01); *C23C 30/00* (2013.01); *C23C 30/005* (2013.01); *C21D 2211/001* (2013.01); *C21D 2211/008* (2013.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01)

HOT DIP GALVANIZED STEEL SHEET AND HOT DIP GALVANNEALED STEEL SHEET

FIELD

The present invention relates to high strength hot dip galvanized steel sheet and high strength hot dip galvannealed steel sheet suitable for press-forming, more particularly relates to high strength hot dip galvanized steel sheet and high strength hot dip galvannealed steel sheet excellent in ductility and low temperature impact property.

BACKGROUND

In today's world, where technical fields in industry have become highly specialized, specialty high performance materials are being sought in individual technical fields. For steel sheet for automotive use, higher levels of both yield strength and tensile strength are being sought for lightening the weight of auto bodies and thereby improving fuel economy.

If applying high strength steel sheet for the body of an automobile, it is possible to reduce the thickness of the steel sheet and lighten the weight of the auto body while imparting the desired strength to the auto body. However, in press-forming for forming the body of an automobile, if the steel sheet becomes thinner, cracks and wrinkles easily occur, so in thin steel sheet for automobile use, excellent uniform ductility and local ductility are also sought.

Further, to improve the collision safety performance of an automobile, the steel sheet has to have excellent impact absorbing property. From the viewpoint of impact absorbing property, the steel sheet for automotive use has to be higher in strength and also excellent in local ductility so as to suppress cracking at the time of application of an impact load.

In this way, steel sheet for automotive use is being required to be high in strength for lightening the weight of auto bodies and improving collision safety, high uniform ductility for improving shapeability, and high local ductility for improving shapeability and improving collision safety. Furthermore, to secure collision safety even in low temperature environments, steel sheet for automotive use is being required to be excellent in low temperature impact property.

However, in steel sheet, improvement of uniform ductility and local ductility and higher strength and improvement of low temperature impact property and higher strength are both contradictory matters. It is difficult to simultaneously achieve these. Further, steel sheet for automotive use is being required to be corrosion resistant, but to maintain the required corrosion resistance, securing ductility and a low temperature impact property while raising the strength is made further difficult.

As the method of improving the ductility of high strength cold rolled steel sheet, the method of making the metal structure contain retained austenite has been proposed. Steel sheet containing retained austenite exhibits large elongation due to transformation induced plasticity (TRIP) appearing due to transformation of austenite to martensite during working.

PTLs 1 and 2 disclose methods for manufacturing high strength cold rolled steel sheet comprising heating steel sheet containing Si and Mn to the ferrite-austenite dual phase region or the austenite single phase region to anneal it, then cooling it, then holding the steel sheet at 350 to 500° C. to austemper it and stabilize the austenite. According to these manufacturing methods, in cold rolled steel sheet, it is possible to improve the strength and ductility with a good balance.

PTL 3 discloses a method of manufacturing high strength hot dip galvannealed steel sheet comprising including certain ratios of more of Si and Mn with respect to the amount of C to thereby suppress transformation of austenite during alloying and form a metal structure in which retained austenite is mixed with ferrite.

PTL 4 discloses high strength hot dip galvanized steel sheet comprised of average grain size 10 μm or less ferrite and tempered martensite into which retained austenite and phases formed by low temperature transformation are dispersed so as to realize excellent ductility, flange elongation, and fatigue resistance. Further, it discloses that tempered martensite is a phase effective for improving the flange elongation and fatigue resistance and that if refining the tempered martensite, the above properties are further improved.

CITATIONS LIST

Patent Literature

[PTL 1] Japanese Unexamined Patent Publication No. 61-157625

[PTL 2] Japanese Unexamined Patent Publication No. 61-217529

[PTL 3] Japanese Unexamined Patent Publication No. 11-279691

[PTL 4] Japanese Unexamined Patent Publication No. 2001-192768

SUMMARY

Technical Problem

In manufacturing hot dip galvanized steel sheet and hot dip galvannealed steel sheet, in general continuous hot dip galvanization facilities, it is not possible to sufficiently austemper the sheets due to restrictions in the holding temperature and holding time, so application of the method for manufacturing cold rolled steel sheet such as disclosed in PTLs 1 and 2 is difficult. Furthermore, in the plating step and alloying step, the austenite easily breaks down, so it is difficult to secure retained austenite in the required amount.

In PTL 3, the deterioration of the local ductility and low temperature impact property, which becomes an issue in steel sheet in which retained austenite is mixed into the metal structure, is not considered at all.

Regarding PTL 4, to obtain a metal structure containing tempered martensite and retained austenite, primary heat treatment for forming the martensite and secondary heat treatment for tempering the martensite and further obtaining retained austenite are required, so the method for manufacturing the steel sheet of PTL 4 greatly falls in productivity. Further, in the method for manufacturing the steel sheet of PTL 4, the secondary heat treatment is performed at a high temperature of the $Ac_1$ point or higher, so the tempered martensite excessively softens and obtaining a high strength is difficult.

As explained above, improvement of strength (yield strength and tensile strength) and improvement of ductility (uniform ductility and local ductility) and the low temperature impact property are contradictory matters, so manufacturing a steel sheet in which all of these are sufficient is difficult in the prior art.

The present invention was made in consideration of the prior art and has as its technical issue the provision of hot dip galvanized steel sheet and hot dip galvannealed steel sheet in which hot dip galvanized steel sheet and hot dip galvannealed steel sheet the uniform ductility and local ductility and the low temperature impact property and yield strength and tensile strength are all improved.

Solution to Problem

The inventors studied in depth methods for solving the above technical issue. As a result, they obtained the findings of the following (A) to (D).

(A) If manufacturing low carbon hot dip galvanized steel sheet containing Si and Mn or low carbon hot dip galvannealed steel sheet containing Si and Mn by a continuous hot dip galvanization facility, sometimes the uniform ductility and local ductility will fall and, furthermore, the yield strength will fall. This is believed to be because with a continuous hot dip galvanization facility, the austempering becomes insufficient and a metal structure containing low C concentration retained austenite and hard martensite is formed.

(B) However, if again heat treating a hot dip galvanized steel sheet and hot dip galvannealed steel sheet having a metal structure containing low C concentration retained austenite and hard martensite, the uniform ductility and local ductility are improved and, furthermore, the yield strength also rises.

This is guessed to be due to the fact that while again heat treating the sheet, the C concentrates at the austenite and the stability of the austenite rises and to the fact that the hard martensite is tempered and changes to soft tempered martensite.

(C) Further, if temper rolling the hot dip galvanized steel sheet and hot dip galvannealed steel sheet before again heat treating the sheet, the uniform ductility and local ductility are further improved and the yield strength also further rises.

This is guessed to be due to the fact that due to the temper rolling, dislocations are introduced into the austenite, the fact that, in the following repeat heat treatment, concentration of C at the austenite is promoted and the stability of the austenite is further improved, that due to the temper rolling, part of the austenite transforms to martensite and, in the metal structure after repeat heat treatment, tempered martensite increases, and that martensite transformation occurring due to cooling after repeat heat treatment is suppressed and, in the metal structure after repeat heat treatment, hard martensite is decreased.

(D) If, at the heating stage of the above repeat heat treatment, the sheet is heated through the low temperature region by a slow rate of temperature rise and through the high temperature region by a fast rate of temperature rise, the low temperature impact property of the hot dip galvanized steel sheet and hot dip galvannealed steel sheet is improved.

This is guessed to be due to the fact that if the prior austenite grain boundaries are reinforced, brittle fracture starting from the prior austenite grain boundaries is suppressed and the low temperature impact property improved, that by slowly heating through the low temperature region, C or B segregates at the prior austenite grain boundaries whereby the grain boundaries are reinforced, and that by rapidly heating through the high temperature region, segregation of P at the prior austenite grain boundaries is suppressed and the grain boundaries are reinforced.

Further, the inventors learned based on the findings of (A) to (D) that if temper rolling hot dip galvanized steel sheet or hot dip galvannealed steel sheet, then again heat treating it by two-stage heating, it is possible to manufacture hot dip galvanized steel sheet and hot dip galvannealed steel sheet having a metal structure containing high C concentration retained austenite and tempered martensite, excellent in uniform ductility, local ductility, and low temperature impact property and, furthermore, high in yield strength and tensile strength.

The present invention was made based on the above findings and has as its gist the following. Note that in the present invention, "steel sheet" includes "steel strip".

(1) A hot dip galvanized steel sheet having a hot dip galvanized layer on the surface, a chemical composition of the steel sheet comprising, by mass %, C: 0.03 to 0.70%, Si: 0.25 to 2.50%, Mn: 1.00 to 5.00%, P: 0.0005 to 0.100%, S: 0.010% or less, sol. Al: 0.001 to 2.500%, N: 0.020% or less, B: 0 to 0.0200%, Ti: 0 to 0.30%, Nb: 0 to 0.30%, V: 0 to 0.30%, Cr: 0 to 2.00%, Mo: 0 to 2.00%, Cu: 0 to 2.00%, Ni: 0 to 2.00%, Ca: 0 to 0.010%, Mg: 0 to 0.010%, REM: 0 to 0.10%, Bi: 0 to 0.050% and a balance of Fe and unavoidable impurities, a metal structure of the steel sheet comprising, by vol %, retained austenite: over 5.0% and tempered martensite: over 5.0% and the retained austenite contains C: 0.85 mass % or more, and a ratio $[C]_{\gamma gb}/[P]_{\gamma gb}$ of an amount of segregation of C (number of atoms/nm$^2$): $[C]_{\gamma gb}$ to an amount of segregation of P (number of atoms/nm$^2$): $[P]_{\gamma gb}$ at prior austenite grain boundaries in the metal structure of the steel sheet being 4.0 or more.

(2) The hot dip galvanized steel sheet according to (1), wherein a chemical composition of the steel sheet comprises, by mass %, at least one of B: 0.0002 to 0.0200%, Ti: 0.001 to 0.30%, Nb: 0.001 to 0.30%, V: 0.001 to 0.30%, Cr: 0.001 to 2.00%, Mo: 0.001 to 2.00%, Cu: 0.001 to 2.00%, Ni: 0.001 to 2.00%, Ca: 0.0001 to 0.010%, Mg: 0.0001 to 0.010%, REM: 0.0001 to 0.10%, and Bi: 0.0001 to 0.050%.

(3) The hot dip galvanized steel sheet according to (1) or (2), wherein in the chemical composition of the steel sheet, a content of B is 0.0002% or more, and a ratio $[B]_{\gamma gb}/[P]_{\gamma gb}$ of an amount of segregation of B (number of atoms/nm$^2$): $[B]_{\gamma gb}$ to an amount of segregation of P (number of atoms/nm$^2$): $[P]_{\gamma gb}$ at prior austenite grain boundaries in the metal structure of the steel sheet is 4.0 or more.

(4) The hot dip galvanized steel sheet according to any one of (1) to (3), wherein the hot dip galvanized layer is a hot dip galvannealed layer.

(5) A method of producing the hot dip galvanized steel sheet according to any one of (1) to (3), the method comprising an annealing step of heating a base steel sheet having a chemical composition as described in (1) or (2) to a temperature region over an Ac$_1$ point to anneal it, a first cooling step of cooling the base steel sheet after the annealing step down to 500° C. or less by an average cooling rate at a temperature region of 650 to 500° C. of 2° C./s or more and less than 100° C./s, a plating step of hot dip galvanizing the base steel sheet after the first cooling step, a second cooling step of cooling the base steel sheet after the plating step down to less than 300° C. by an average cooling rate at a temperature region of the plating temperature to 300° C. of 2° C./s or more, a temper rolling step of temper rolling the base steel sheet after the second cooling step by an elongation rate of 0.10% or more, and a two-stage heat treatment step of heating the base steel sheet after the temper rolling step up to 300° C. by an average heating rate in the temperature region up to 300° C. of less than 10° C./s, then heating it by an average heating rate in the temperature region over 300° C. of over 10° C./s up to a temperature region of over 300° C. to 600° C., then holding it at that heating temperature for 1 second or more as heat treatment.

(6) A method of producing a hot dip galvannealed steel sheet according to (4), the method comprising an annealing step of heating a base steel sheet of a chemical composition as described in (1) or (2) to a temperature region over an $Ac_1$ point to anneal it, a first cooling step of cooling the base steel sheet after the annealing step down to 500° C. or less by an average cooling rate at a temperature region of 650 to 500° C. of 2° C./s or more and less than 100° C./s, a plating step of hot dip galvanizing the base steel sheet after the first cooling step, an alloying step of alloying the base steel sheet after the plating step, a second cooling step of cooling the base steel sheet after the alloying step down to less than 300° C. by an average cooling rate at a temperature region of the alloying temperature to 300° C. of 2° C./s or more, a temper rolling step of temper rolling the base steel sheet after the second cooling step by an elongation rate of 0.10% or more, and a two-stage heat treatment step of heating the base steel sheet after the temper rolling step up to 300° C. by an average heating rate in the temperature region up to 300° C. of less than 10° C./s, then heating it by an average heating rate in the temperature region over 300° C. of over 10° C./s to a temperature region of over 300° C. to 600° C., then holding at that heating temperature for 1 second or more as heat treatment.

Advantageous Effects of Invention

According to the present invention, it is possible to provide hot dip galvanized steel sheet and hot dip galvannealed steel sheet in which the uniform ductility and local ductility are both excellent, which are excellent in press-formability, further in which the yield strength and tensile strength are high and local ductility is excellent, which are excellent in impact absorbing property, and furthermore which are also excellent in low temperature impact property.

DESCRIPTION OF EMBODIMENTS

Below, the chemical compositions, metal structures, and mechanical properties of the hot dip galvanized steel sheet and hot dip galvannealed steel sheet (below, referred to overall as "the steel sheet of the present invention") will be successively explained.

First, the chemical composition of the steel sheets of the present invention will be explained. Below, "%" relating to the chemical composition means "mass %".

C: 0.03 to 0.70%

C is an element required for obtaining retained austenite. Furthermore, it is an element strengthening the grain boundaries by segregation at the prior austenite grain boundaries in the steel sheet of the present invention. If C is less than 0.03%, it becomes difficult to obtain a metal structure containing retained austenite and tempered martensite, so C is made 0.03% or more. Preferably, it is 0.10% or more, more preferably 0.13% or more, still more preferably 0.16% or more.

On the other hand, if C is over 0.70%, the weldability of the steel sheet remarkably falls, so C is made 0.70% or less. Preferably, it is 0.30% or less, more preferably 0.26% or less, still more preferably 0.24% or less.

Si: 0.25 to 2.50%

Si is an element acting to suppress the segregation of cementite and promote the formation of retained austenite. Further, it is an element keeping the tempered martensite from excessively softening and contributing to securing strength.

If Si is less than 0.25%, the effect of addition is not sufficiently obtained, so Si is made 0.25% or more, preferably over 0.60%, more preferably over 1.00%, still more preferably over 1.45%.

On the other hand, if Si is over 2.50%, the plateability of the steel sheet remarkably falls and the weldability of the steel sheet falls, so Si is made 2.50% or less. Preferably, it is 2.30% or less, more preferably 2.10% or less, still more preferably 1.90% or less.

Mn: 1.00 to 5.00%

Mn is an element contributing to improvement of the hardenability of steel and effective for obtaining a metal structure containing retained austenite and tempered martensite. If Mn is less than 1.00%, the effect of addition is not sufficiently obtained, so Mn is made 1.00% or more. Preferably, it is over 1.50%, more preferably over 2.00%, still more preferably over 2.50%.

On the other hand, if Mn is over 5.00%, the weldability of the steel sheet falls, so Mn is made 5.00% or less. Preferably, it is 4.00% or less, more preferably 3.50% or less, still more preferably 3.00% or less.

P: 0.0005 to 0.100%

P is an element which segregates at the prior austenite grain boundaries to make the steel sheet brittle, so the less the better. However, the present invention is art suppressing segregation of P at the prior austenite grain boundaries and causing segregation of C and B and is predicated on P remaining in the steel to a certain extent. For that reason, there is no need to excessively reduce P. In particular, if reducing P to less than 0.0005%, the manufacturing cost greatly rises, so P can be made 0.0005% or more. It may also be made 0.0010% or more.

On the other hand, if P is over 0.100%, the segregation becomes remarkable and the steel sheet becomes remarkably brittle, so P is made 0.100% or less. Preferably, it is made less than 0.020%, more preferably less than 0.015%, still more preferably less than 0.010%.

S: 0.010% or Less

S is an element forming sulfide-based inclusions in the steel for obstructing local ductility of the steel sheet, so the less the better. If S is over 0.010%, the local ductility of the steel sheet remarkably falls, so S is made 0.010% or less. Preferably, it is 0.0050% or less, more preferably 0.0012% or less.

The lower limit includes 0%, but if reducing S to less than 0.0001%, the manufacturing cost greatly rises, so in practical steel sheet, 0.0001% is the substantive lower limit.

sol. Al: 0.001 to 2.500%

Al, like Si, is an element acting to deoxidize the molten steel. Further, it is an element promoting the formation of retained austenite and effective for forming a metal structure containing retained austenite and tempered martensite.

If sol. Al is less than 0.001%, the effect of deoxidation cannot be sufficiently obtained, so sol. Al is made 0.001% or more. Preferably, it is 0.015% or more, more preferably 0.025% or more, still more preferably 0.045% or more. From the point of promoting retained austenite, it is preferably 0.055% or more, more preferably 0.065% or more, still more preferably 0.075% or more.

On the other hand, if sol. Al is over 2.500%, a large amount of alumina ($Al_2O_3$) causing surface defects is formed or the transformation point rises and annealing becomes difficult, so sol. Al is made 2.500% or less. Preferably, it is less than 0.600%, more preferably less than 0.200%, still more preferably less than 0.080%.

N: 0.020% or Less

N is an element forming nitrides causing cracks in a slab during continuous casting of steel, so the less, the better. If N is over 0.020%, slab cracks frequently occur, so N is made 0.020% or less. Preferably, it is 0.010% or less, more preferably less than 0.008%, still more preferably 0.005% or less.

The lower limit includes 0%, but if reducing N to less than 0.0005%, the manufacturing costs greatly rise, so in practical steel sheet, 0.0005% is the substantive lower limit.

B: 0 to 0.0200%

B, like C, is an element which segregates at the prior austenite grain boundaries and strengthens the grain boundaries. Hot dip galvanized steel sheet and hot dip galvannealed steel sheet in which the uniform ductility and local ductility of the steel sheet of the present invention are both excellent, which are excellent in press formability, further in which the yield strength and tensile strength are high and local ductility is excellent, which are excellent in impact absorbing property, and furthermore which are also excellent in low temperature impact property can be obtained even without adding B, but by adding B, the effect of strengthening the grain boundaries further rises, so this can be added in accordance with need. Further, B is an element improving the hardenability of steel and effective for forming a metal structure containing retained austenite and tempered martensite. To sufficiently obtain the effect of addition, B is preferably made 0.0002% or more. More preferably, it is 0.0005% or more, still more preferably 0.0010% or more.

On the other hand, if B is over 0.0200%, the effect of addition becomes saturated and the economy falls, so B is made 0.0200% or less. Preferably, it is 0.0100% or less, more preferably 0.0050% or less, still more preferably 0.0020% or less.

The steel sheet of the present invention may include, in addition to the above elements, one or more of Ti, Nb, V, Cr, Mo, Cu, Ni, Ca, Mg, REM, and Bi so as to improve the properties.

Ti: 0 to 0.30%, Nb: 0 to 0.30%, and V: 0 to 0.30%

Ti, Nb, and V are elements refining the metal structure and contributing to improvement of the strength and ductility of the steel sheet. To sufficiently obtain the effect of addition of Ti, Nb, and V, Ti, Nb, and V are all preferably 0.001% or more. More preferably, Ti and Nb are 0.005% or more and V is 0.010% or more, still more preferably Ti and Nb are 0.010% or more and V is 0.020% or more.

On the other hand, if Ti, Nb, and V exceed 0.30%, the effect of addition becomes saturated and the recrystallization temperature at the time of annealing rises resulting in the annealed metal structure becoming uneven and the local ductility falling, so Ti, Nb, and V all are 0.30% or less. More preferably, Ti is less than 0.080%, Nb is less than 0.050%, and V is 0.20% or less, still more preferably Ti is 0.035% or less, Nb is 0.030% or less, and V is less than 0.10%.

Cr: 0 to 2.00% and Mo: 0 to 2.00%

Cr and Mo are elements improving the hardenability of steel and contributing to formation of a metal structure containing retained austenite and tempered martensite. To sufficiently obtain the effects of addition of Cr and Mo, both are preferably 0.001% or more. More preferably, Cr is 0.100% or more, while Mo is 0.050% or more.

On the other hand, if Cr and Mo are over 2.00%, the effect of addition becomes saturated and the economy falls, so Cr and Mo are both 2.00% or less. More preferably, Cr is 1.00% or less and Mo is 0.50% or less.

Cu: 0 to 2.00% and Ni: 0 to 2.00%

Cu and Ni are elements contributing to improvement of yield strength and tensile strength. To sufficiently obtain the effects of addition of Cu and Ni, Cu and Ni are both preferably 0.001% or more. More preferably, both elements are 0.010% or more.

On the other hand, if Cu and Ni exceed 2.00%, the effect of addition becomes saturated and the economy falls, so Cu and Ni are both 2.00% or less. More preferably, both elements are 0.80% or less.

Ca: 0 to 0.010%, Mg: 0 to 0.010%, and REM: 0 to 0.10%

Ca, Mg, and REM are elements controlling the shape of inclusions to contribute to improvement of the local ductility. To sufficiently obtain the effect of addition of Ca, Mg, and REM, Ca, Mg, and REM are all preferably 0.0001% or more. More preferably, each element is 0.0005% or more.

On the other hand, if Ca and Mg are over 0.010%, the effect of addition becomes saturated and the economy falls, so Ca and Mg are preferably 0.010% or less. More preferably each element is 0.002% or less.

If the REM is over 0.10%, the effect of addition becomes saturated and the economy falls, so preferably the REM is made 0.10% or less. More preferably, it is 0.010% or less.

"REM" is the general name for Sc, Y, and lanthanoids: a total of 17 elements. Lanthanoids are industrially added in the form of mischmetal. Note that the amount of the REM is the total amount of these elements.

Bi: 0 to 0.050%

Bi is an element refining the solidified structure to contribute to improvement of the local ductility. To sufficiently obtain the effect of addition of Bi, Bi is preferably 0.0001% or more. More preferably, it is 0.0003% or more.

On the other hand, if Bi is over 0.050%, the effect of addition becomes saturated and the economy falls, so Bi is preferably 0.050% or less. More preferably it is 0.010% or less, still more preferably 0.005% or less.

The balance of the chemical composition of the steel sheet of the present invention is Fe and unavoidable impurities. The unavoidable impurities are elements unavoidably entering from the steel raw material (ore, scrap, etc.) and/or at the manufacturing process and are elements allowed in a range not obstructing the properties of the steel sheet of the present invention.

Next, the metal structure of the steel sheet of the present invention will be explained. Below, the "%" relating to the structural percentage means the "vol %".

Retained Austenite: Over 5.0% and Tempered Martensite: Over 5.0%

The metal structure of the steel sheet of the present invention is a metal structure comprised of, by vol %, retained austenite of over 5.0% and tempered martensite of over 5.0%. By forming this metal structure, it is possible to maintain the yield strength and tensile strength while improving the uniform ductility and local ductility.

If the retained austenite is 5.0% or less, the uniform ductility is not improved, so the retained austenite is made over 5.0%. Preferably, it is over 6.0%, more preferably over 8.0%, still more preferably over 10.0%.

The vol % of the retained austenite is not unambiguously determined in relation to the vol % of other structures, so no upper limit can be set, but if 30.0% or more, the local ductility and low temperature impact property deteriorate, so the retained austenite is preferably less than 30.0%. More preferably, it is less than 20.0%.

If the tempered martensite is 5.0% or less, it is difficult to maintain the yield strength and tensile strength while raising the local ductility, so the tempered martensite is made over 5.0%. Preferably, it is over 8.0%, more preferably over 10.0%, still more preferably over 12.0%.

The vol % of the tempered martensite is not unambiguously determined in relation to the vol % of other structures, so no upper limit can be set, but if 70.0% or more, the uniform ductility falls, so the tempered martensite is preferably 70.0% or less. More preferably, it is 50.0% or less, still more preferably 30.0% or less.

The balance of the metal structure is a structure including polygonal ferrite, low-temperature transformation structure such as martensite (indicating not tempered martensite, also called "fresh martensite"), acicular ferrite or bainite, and pearlite, and furthermore precipitates such as cementite and others.

Polygonal ferrite is a structure effective for raising the uniform ductility, so is preferably contained in over 2.0%. More preferably, it is 3.0% or more.

The vol % of the polygonal ferrite is not unambiguously determined in relation to the vol % of other structures, so no upper limit can be set, but if the polygonal ferrite is 50.0% or more, the yield strength and the tensile strength fall and furthermore the local ductility falls, so the polygonal ferrite is preferably less than 50.0%. More preferably, it is less than 20.0%, still more preferably less than 10.0%.

Martensite is a structure obstructing the maintenance of yield strength and improvement of the local ductility, so the less, the better. Preferably, it is less than 5.0%. More preferably, it is less than 2.0%, still more preferably less than 1.0%.

Low-temperature transformation structure such as acicular ferrite or bainite, and precipitates such as pearlite, cementite, and others obstruct the yield strength and tensile strength, so the total is preferably 40.0% or less. More preferably, it is 20.0% or less, still more preferably 10.0% or less.

Pearlite inhibits the uniform ductility in addition to the yield strength and tensile strength, so less than 10.0% is preferable. More preferably, it is less than 5.0%, still more preferably less than 3.0%.

The low-temperature transformation structure such as martensite, acicular ferrite, and bainite, pearlite, and precipitates such as cementite and others are sometimes unavoidably formed, so lower limits are not particularly prescribed, but the balance of the metal structure does not have to include these structures, so the lower limit is 0%.

The vol % of the metal structure of the steel sheet of the present invention is measured in the following way.

Further, a test piece was taken from the steel sheet, a longitudinal section parallel to the rolling direction was polished, then the metal structure at a depth position of ¼ of the sheet thickness of the base steel sheet from the boundary of the base steel sheet and plating layer was observed and photographed by a scan electron microscope (SEM). The image was processed to calculate the area ratios of the structures and the calculated area ratios were made the volume ratios.

Tempered martensite can be differentiated from bainite on the point that iron carbides present inside it extend in a plurality of directions. Polygonal ferrite can be differentiated from acicular ferrite on the point that it is clump shaped in form and on the point that the dislocation density is low.

Amount of C of Retained Austenite: 0.85 Mass % or More

In the steel sheet of the present invention, to stabilize the retained austenite and improve the uniform ductility and local ductility, the amount of C of the retained austenite is made 0.85 mass % or more. Preferably, it is 0.87 mass % or more, more preferably 0.89 mass % or more. Note that, the "amount of C of the retained austenite" means the concentration of C at the austenite phases.

The amount of C of the retained austenite fluctuates according to the amount of C of the steel sheet and the manufacturing conditions, so the upper limit cannot be set, but if the amount of C is 1.50 mass % or more, the TRIP effect cannot be obtained and the uniform ductility falls, so the amount of C of the retained austenite is preferably less than 1.50 mass %. More preferably, it is less than 1.20 mass %, still more preferably less than 1.10 mass %.

The vol % of the retained austenite and the amount of C of the retained austenite are calculated by chemical polishing the rolling surface at a depth position of ¼ of the sheet thickness of the base steel sheet from the boundary of the base steel sheet and plating layer at the test piece taken from the steel sheet and measuring the X-ray diffraction intensity and diffraction peak position of the polished surface by an X-ray diffraction apparatus (XRD).

$[C]_{\gamma gb}/[P]_{\gamma gb}$: 4.0 or More

By making the ratio $[C]_{\gamma gb}/[P]_{\gamma gb}$ of the amount of segregation of C (number of atoms/nm$^2$): $[C]_{\gamma gb}$ at the prior austenite grain boundaries to the amount of segregation of P (number of atoms/nm$^2$): $[P]_{\gamma gb}$ at the prior austenite grain boundaries 4.0 or more, the low temperature impact property is remarkably improved.

If $[C]_{\gamma gb}/[P]_{\gamma gb}$ is less than 4.0, the low temperature impact property is not improved, so $[C]_{\gamma gb}/[P]_{\gamma gb}$ is made 4.0 or more. Preferably, it is 5.0 or more, more preferably 6.0 or more. The upper limit is not particularly prescribed, but from the viewpoint of productivity, 30.0 or less is preferable.

The $[C]_{\gamma gb}$ and $[P]_{\gamma gb}$ at the prior austenite grain boundaries are measured in the following way to calculate $[C]_{\gamma gb}/[P]_{\gamma gb}$.

In a test piece taken from the steel sheet, the metal structure at a depth position of ¼ of the sheet thickness of the base steel sheet from the boundary of the base steel sheet and the plating layer is observed to confirm the prior austenite grain boundaries. The lift-out method is used to cut out a block including the prior austenite grain boundaries and a focused ion beam apparatus (FIB) is used to prepare a pin sample for use as a three-dimensional atom probe (3DAP).

Using the 3DAP, the distributions of atoms of C and P at the region including the prior austenite grain boundaries are measured. The distributions of concentration are analyzed by a ladder diagram to find the densities of segregated atoms per unit grain boundary area (interfacial excess). The obtained values are made $[C]_{\gamma gb}$ and $[P]_{\gamma gb}$. $[C]_{\gamma gb}$ and $[P]_{\gamma gb}$ are measured for different prior austenite grain boundaries of five or more locations. The average value of the values of the $[C]_{\gamma gb}/[P]_{\gamma gb}$ obtained at the prior austenite grain boundaries are found.

$[B]_{\gamma gb}/[P]_{\gamma gb}$: 4.0 or More

If the steel sheet of the present invention contains B, furthermore, by making the ratio $[B]_{\gamma gb}/[P]_{\gamma gb}$ of the amount of segregation of B (number of atoms/nm$^2$): $[B]_{\gamma gb}$ at the prior austenite grain boundaries to the amount of segregation of P (number of atoms/nm$^2$): $[P]_{\gamma gb}$ at the prior austenite grain boundaries 4.0 or more, the low temperature impact property is remarkably improved.

If $[B]_{\gamma gb}/[P]_{\gamma gb}$ is less than 4.0, the low temperature impact property is not improved, so $[B]_{\gamma gb}/[P]_{\gamma gb}$ is made 4.0 or more. Preferably, it is 5.0 or more, more preferably 6.0 or more. The upper limit is not particularly prescribed, but from the viewpoint of productivity, 30.0 or less is preferable.

The $[B]_{\gamma gb}$ and $[P]_{\gamma gb}$ at the prior austenite grain boundaries are measured in the following way to calculate $[B]_{\gamma gb}/[P]_{\gamma gb}$.

In a test piece taken from the steel sheet, the metal structure at a depth position of ¼ of the sheet thickness of the base steel sheet from the boundary of the base steel sheet and the plating layer is observed to confirm the prior austenite grain boundaries. The lift-out method is used to cut out a block including the prior austenite grain boundaries and a focused ion beam apparatus (FIB) is used to prepare a pin sample for use as a three-dimensional atom probe (3DAP).

Using the 3DAP, the distributions of atoms of B and P at the region including the prior austenite grain boundaries are measured. The distributions of concentration are analyzed by a ladder diagram to find the densities of segregated atoms per unit grain boundary area (interfacial excess). The obtained values are made $[B]_{\gamma gb}$ and $[P]_{\gamma gb}$. $[B]_{\gamma gb}$ and $[P]_{\gamma gb}$ are measured for different prior austenite grain boundaries of five or more locations. The average value of the values of the $[B]_{\gamma gb}/[P]_{\gamma gb}$ obtained at the prior austenite grain boundaries are found.

Next, the hot dip galvanized layer and the hot dip galvannealed layer of the steel sheet of the present invention will be explained.

The hot dip galvanized layer and hot dip galvannealed layer may be formed under usual plating conditions and alloying conditions. However, if the amount of Fe of the hot dip galvannealed layer is less than 7 mass %, the weldability and slidability cannot be secured, so the amount of Fe of the hot dip galvannealed layer is preferably 7 mass % or more. The upper limit of the amount of Fe is 20 mass % or less from the viewpoint of suppression of powdering resistance, more preferably 15 mass % or less. The amount of Fe of the hot dip galvannealed layer is adjusted by suitably adjusting the alloying conditions.

Next, the mechanical properties of the steel sheet of the present invention will be explained.

Regarding the elongation characteristic of steel sheet, the uniform elongation in a direction perpendicular to the rolling direction is defined as "UE1" (uniform elongation), the value of the total elongation ($TE1_0$) in a direction perpendicular to the rolling direction converted to the total elongation corresponding to a sheet thickness of 1.2 mm based on the following formula (1) is defined as "TE1" (total elongation), and the local elongation in a direction perpendicular to the rolling direction, corresponding to a sheet thickness 1.2 mm based on the following formula (2), is defined as "LE1" (local elongation).

$$TE1 = TE1_0 \times (1.2/t_0)^{0.2} \quad (1)$$

$$LE1 = TE1 - UE1 \quad (2)$$

The UE1 is the measured value of uniform elongation measured using a JIS No. 5 tensile test piece, $TE1_0$ is the measured value of the total elongation measured using a JIS No. 5 tensile test piece, and $t_0$ is the sheet thickness of the JIS No. 5 tensile test piece used for measurement. TE1 and LE1 are respectively the total elongation and local elongation converted to the case of a sheet thickness of 1.2 mm.

TS×UE1 becomes a large value if both of the tensile strength (TS) and uniform elongation (UE1) are excellent, so is used as an indicator for evaluating the uniform ductility.

TS×LE1 becomes a large value if both of the tensile strength (TS) and local elongation (LE1) are excellent, so is used as an indicator for evaluating the local ductility.

In the steel sheet of the present invention, from the viewpoint of the press formability, TS×UE1 is preferably 10000 MPa·% or more while TS×LE1 is preferably 5000 MPa·% or more. More preferably, TS×UE1 is 11000 MPa·% or more, while TS×LE1 is preferably 6000 MPa·% or more. Still more preferably TS×UE1 is 12000 MPa·% or more, while TS×LE1 is 7000 MPa·% or more.

To improve the impact absorbing property of the steel sheet of the present invention, the tensile strength (TS) is preferably 780 MPa or more, more preferably 980 MPa or more, still more preferably 1180 MPa or more. The yield ratio (YR) is preferably 0.59 or more, more preferably 0.66 or more, still more preferably 0.72 or more.

The more excellent the local ductility, the more cracking at the time of application of an impact load is suppressed and the more the absorption energy rises, so from the viewpoint of crack suppression, TS×LE1 is preferably 5500 MPa·% or more, more preferably 6500 MPa·% or more.

Regarding the low temperature impact property of the steel sheet, a plurality of subsize Charpy impact test pieces having the directions perpendicular to the rolling direction as the length directions and having lengths of 55 mm, thicknesses of 10 mm, and widths of the sheet thicknesses of the steel sheets are stacked in the width direction and subjected to a Charpy impact test in that state. The notch shapes of the test pieces are made the V-notches prescribed in JIS Z 2242. The Charpy impact values when conducting the Charpy impact tests by test temperatures of −60° C. and 40° C. are respectively defined as $IV_{LT}$ and $IV_{HT}$.

$IV_{LT}/IV_{HT}$ can be used as an indicator for evaluating the low temperature impact property. In the steel sheet of the present invention, $IV_{LT}/IV_{HT}$ is preferably over 0.50, more preferably over 0.60, still more preferably over 0.70.

Next, the method for manufacturing the steel sheet of the present invention will be explained.

Base Steel Sheet

The steel sheet before plating of the present invention (below, referred to as the "base steel sheet") need only be a steel sheet having the chemical composition of the steel sheet of the present invention. The method for manufacturing the base steel sheet is not limited to a specific method of manufacture. As the base steel sheet, a hot rolled steel sheet can be used. Further, a cold rolled steel sheet obtained by pickling, then cold rolling a hot rolled steel sheet can also be used. Below, one example of a method for manufacturing a base steel sheet will be explained.

Casting

The method of casting the slab is not limited to any specific casting method, but the continuous casting method is preferable. It is also possible to use a steel ingot cast by another casting method as a steel slab by blooming etc. In the continuous casting process, to keep surface defects due to inclusions from forming, the molten steel is preferably made to flow inside the casting mold by electromagnetic stirring etc. The steel ingot in the high temperature state after continuous casting or the steel slab in the high temperature state after blooming may be cooled once, then reheated and used for hot rolling.

Further, the steel ingot in the high temperature state after continuous casting or the steel slab in the high temperature state after blooming may be used as is for hot rolling or may be used for hot rolling after auxiliary heating. Not that the steel ingot and steel slab used for the hot rolling will be generally referred to as a "slab".

To prevent coarsening of the austenite, the temperature of the slab used for the hot rolling is preferably less than 1250° C. More preferably, it is 1200° C. or less. The lower limit of the temperature of the slab used for the hot rolling is not particularly prescribed, but the temperature at which the hot rolling can be completed at the $Ar_3$ point or more is preferable.

Hot Rolling

The conditions of the hot rolling are not limited to specific conditions, but if the temperature of completion of the hot rolling is too low, in the metal structure of the hot rolled steel sheet, coarse low-temperature transformed structure stretched in the rolling direction are liable to be formed.

This coarse low-temperature transformed structure obstructs the uniform ductility and local ductility, so the temperature of completion of hot rolling is preferably the $Ar_3$ point or more and over 850° C. More preferably, it is the $Ar_3$ point or more and over 880° C., still more preferably the $Ar_3$ point or more and over 900° C. The upper limit of the temperature of completion of hot rolling is not particularly prescribed, but from the viewpoint of refining the metal structure of the hot rolled steel sheet, 1000° C. or less is preferable.

If the hot rolling is comprised of rough rolling and finish rolling, to maintain the temperature of completion of the hot rolling within the above temperature range, the rough rolled material may also be heated between the rough rolling and finish rolling.

At this time, preferably the rough rolled material is heated so that the back end of the rough rolled material becomes a higher temperature than the front end of the rough rolled material and the variation in temperature over the entire length of the rough rolled material at the time of start of the finish rolling is controlled to 140° C. or less. Due to this temperature suppression, the uniformity of properties in the coil of the hot rolled steel sheet taken up is improved.

The rough rolled material may be heated using a known means. For example, a solenoid type induction heating apparatus may be provided between the rough rolling machine and finish rolling machine and the amount of temperature rise by heating by the solenoid type induction heating apparatus may be controlled based on the temperature distribution in the longitudinal direction of the rough rolled material at the upstream side of this induction heating apparatus etc.

The conditions from after the end of the hot rolling to the start of coiling may be the usual conditions, but by softening the hot rolled steel sheet, the cold rollability of the hot rolled steel sheet is improved. For this, the coiling temperature is preferably 600° C. or more. The coiling temperature is more preferably 640° C. or more, more preferably 680° C. or more. If the coiling temperature is too high, the pickling ability of the hot rolled steel sheet falls, so the coiling temperature is preferably 750° C. or less, more preferably less than 720° C.

Cold Rolling

The conditions of the cold rolling are not limited to specific conditions. Before cold rolling, a hot rolled steel sheet may be pickled or otherwise treated to remove scale. To make the metal structure uniform and further improve the local ductility after the annealing, the rolling reduction of the cold rolling is preferably 40% or more. If the rolling reduction is too high, the rolling load increases and rolling becomes difficult, so the rolling reduction is preferably less than 70%, more preferably less than 60%.

Annealing

A base steel sheet is heated at a temperature over the $Ac_1$ point to anneal it. The $Ac_1$ point is the temperature at which austenite starts to be formed in the metal structure when heating the base steel sheet.

If the heating temperature is the $Ac_1$ point or more, austenite is not formed, retained austenite is not obtained in the metal structure of the steel sheet of the present invention, and the uniform ductility falls, so the heating temperature is preferably over the $Ac_1$ point. More preferably, it is over $(Ac_1+30)°$ C.

To make the metal structure of the steel sheet uniform and further improve the local ductility, the heating temperature is preferably the $(Ac_3$ point-40$)°$ C. or more. More preferably, it is over the $Ac_3$ point. The $Ac_3$ point is the temperature at which ferrite disappears in the metal structure when heating a base steel sheet.

If the heating temperature is too high, the austenite becomes coarser and the local ductility is impaired, so the heating temperature is preferably the $(Ac_3$ point+100$)°$ C. or less, more preferably the $(Ac_3$ point+50$)°$ C. or less.

The holding time at the heating temperature is not particularly limited, but to make the metal structure of the base steel sheet uniform, 10 seconds or more is preferable. From the viewpoint of coarsening of the austenite, 240 seconds or less is preferable.

After annealing, the base steel sheet is cooled down to a temperature region of 500° C. or less by an average cooling rate in the temperature region of 650 to 500° C. of 2° C./s to less than 100° C./s without isothermal holding in the middle.

The cooling temperature region prescribing the average cooling rate is made a temperature region of 650 to 500° C. In this temperature region, ferrite and pearlite precipitate, so to adjust the amount of precipitation and secure the required mechanical properties, the cooling rate has to be controlled.

If the average cooling rate in the temperature region of 650 to 500° C. is less than 2° C./s, polygonal ferrite and pearlite are excessively produced and the yield strength and tensile strength fall, so the average cooling rate in the above temperature region is preferably 2° C./s or more. More preferably, it is 4° C./s or more, more preferably 10° C./s or more.

On the other hand, if the average cooling rate in the temperature region of 650 to 500° C. is 100° C./s or more, the precision of the shape and dimension of the steel sheet falls, so the average cooling rate in the above temperature region is preferably less than 100° C./s. More preferably, it is 30° C./s or less.

The base steel sheet is cooled to 500° C. or less by an average cooling rate in the temperature region of 650 to 500° C. of 2° C./s to less than 100° C./s. The cooling conditions after cooling to 500° C. or less are not particularly limited, but in the metal structure after plating, it is preferable to adjust the vol % of the retained austenite and the amount of C of the retained austenite and, from the point of improving the uniform ductility and local ductility and raising the yield strength, it is preferable to hold the base steel sheet in the temperature region of 500° C. to 460° C. for 4 to 45 seconds.

Hot Dip Galvanization

The base steel sheet is hot dip galvanized in accordance with an ordinary method. One surface or both surfaces of the base steel sheet are formed with a hot dip galvanized layer. Before hot dip galvanizing the base steel sheet, the base steel sheet may be suitably cooled and/or heated.

The bath temperature and bath composition of the hot dip galvanization may be the usual bath temperature and bath composition. The amount of plating deposition may also be the usual amount of deposition. For example, a range of 20 to 80 g/m² per surface of the base steel sheet is preferable.

The base steel sheet having the hot dip galvanized layer may be heated to the required temperature to alloy the hot dip galvanized layer. The alloying may be performed under usual conditions. For example, the alloying may be performed at 470 to 560° C. for 5 to 60 seconds. However, a condition where the amount of Fe in the plating layer becomes 7 mass % or more is preferable.

Cooling After Plating or Alloying

The plated or alloyed steel sheet is cooled down to less than 300° C. by an average cooling rate in the temperature from the plating temperature down to 300° C. and in the temperature region from the alloying temperature down to 300° C. of 2° C./s or more.

If the average cooling rate is less than 2° C./s, pearlite is excessively formed, the yield strength and tensile strength fall, further, the amount of retained austenite decreases, and the uniform ductility falls, so the average cooling rate is preferably 2° C./s or more. More preferably, it is over 10° C./s.

The upper limit of the average cooling rate is not particularly limited, but from the viewpoint of economy, 500° C./s or less is preferable. The cooling stopping temperature is less than 300° C., but from the viewpoint of effectively performing the later temper rolling, the cooling stopping temperature is preferably room temperature.

Temper Rolling

Before two-stage heat treatment of steel sheet having a hot dip galvanized layer or alloyed plating layer, the sheet is temper rolled by an elongation rate of 0.10% or more. Due to this temper rolling, in the subsequent two-stage heat treatment, the concentration of C at the austenite is promoted, the uniform ductility and local ductility are improved, and the yield strength is improved.

If the elongation rate is less than 0.10%, in the subsequent two-stage heat treatment, concentration of C at the austenite is not promoted, the uniform ductility and local ductility are not improved, and, further, the yield strength is not improved, so the elongation rate is preferably 0.10% or more. More preferably, it is 0.30% or more, still more preferably 0.50% or more.

The upper limit of the elongation rate is not particularly prescribed, but if too high, the rolling load increases, so the elongation rate is preferably 2.00% or less. More preferably, it is less than 1.50%, still more preferably less than 1.00%.

The temper rolling temperature is not particularly limited, but from the point of effectively imparting work strain to the austenite, the lower the temperature, the better. Room temperature is particularly preferred.

Two-Stage Heat Treatment

Steel sheet having a hot dip galvanized layer or hot dip galvannealed layer is temper rolled by an elongation rate of 0.10% or more, then the steel sheet is heated up to 300° C. by an average heating rate of less than 10° C./s, then is heated in the over 300° C. to 600° C. temperature region by an average heating rate of 10° C./s or more and is held at the heating temperature in the over 300° C. to 600° C. temperature region for 1 second or more.

Due to this two-stage heat treatment, the ratio $[C]_{\gamma gb}/[P]_{\gamma gb}$ of the amount of segregation of C (number of atoms/nm²): $[C]_{\gamma gb}$ to the amount of segregation of P (number of atoms/nm²): $[P]_{\gamma gb}$ at the prior austenite grain boundaries satisfies $[C]_{\gamma gb}/[P]_{\gamma gb} \geq 4.0$, C concentrates at the retained austenite and reaches 0.85 mass % or more, and the martensite is tempered. As a result, the uniform ductility and local ductility are improved, the yield strength is improved, and the low temperature impact property is improved.

Furthermore, if the steel sheet contains B, the ratio $[B]_{\gamma gb}/[P]_{\gamma gb}$ of the amount of segregation of B (number of atoms/nm²): $[B]_{\gamma gb}$ to the amount of segregation of P (number of atoms/nm²): $[P]_{\gamma gb}$ is satisfied $[B]_{\gamma gb}/[P]_{\gamma gb} \geq 4.0$, the uniform ductility and local ductility are improved, the yield strength is improved, and the low temperature impact property is improved.

Below, the steps and conditions of the two-stage heat treatment will be explained.

Average Heating Rate Up to 300° C.: Less Than 10° C./s

In the metal structure of the temper rolled steel sheet, C is made to concentrate at the austenite and martensite is tempered by heating the metal structure to an over 300° C. to 600° C. temperature region. At this time, up to 300° C., the heating is performed by a less than 10° C./s average heating rate. This heating promotes segregation of C and B at the prior austenite grain boundaries.

If the average heating rate up to 300° C. is 10° C./s or more, segregation of C and B at the prior austenite grain boundaries is not promoted, so the average heating rate up to 300° C. is made less than 10° C./s. Preferably, it is 7° C./s or less, more preferably 3° C./s or less.

Average Heating Rate at Temperature Region of Over 300° C. to 600° C.: 10° C./s or More By making the average heating rate up to the heating temperature in the temperature region of over 300° C. to 600° C. 10° C./s or more, it is possible to suppress segregation of P at the prior austenite grain boundaries.

That is, by changing the average heating rate of less than 10° C./s at boundary of 300° C. to 10° C./s or more, it is possible to realize the following formula (3). If the steel sheet contains B, it is possible to realize the following formula (4). The average heating rate in the over 300° C. to 600° C. temperature region is preferably over 20° C./s.

$$[C]_{\gamma gb}/[P]_{\gamma gb} \geq 4.0 \qquad (3)$$

$$[B]_{\gamma gb}/[P]_{\gamma gb} \geq 4.0 \qquad (4)$$

If the above formulas are realized at the prior austenite grain boundaries, at the prior austenite grain boundaries, the strengthening actions of C and B are increased, the embrittlement action of P is suppressed, and the low temperature impact property can be improved.

Holding Time at Temperature Region of Over 300° C. to 600° C.: 1 s or More

After the above two-stage heating, the steel sheet is held at a heating temperature of a temperature region of over 300° C. to 600° C. for 1 second or more. If the heating temperature is 300° C. or less, C insufficiently concentrates at the austenite, the uniform ductility is not improved, and, further, hard martensite remains and the local ductility is impaired and the yield strength falls, so the heating temperature is made over 300° C. Preferably it is over 350° C., more preferably over 400° C.

On the other hand, if the heating temperature is over 600° C., the amount of the retained austenite becomes insufficient, the uniform ductility falls, further, the tempered martensite excessively softens and the yield strength and tensile strength fall, and, further, hard fresh martensite is formed and the local ductility falls and the yield strength falls, so the heating temperature is made 600° C. or less. Preferably the temperature is 550° C. or less, more preferably 500° C. or less.

If the heating and holding time is less than 1 second, C insufficiently concentrates at the austenite and the uniform ductility is not improved. Further, hard martensite remains, the local ductility falls, and the yield strength falls, so the heating and holding time is made 1 second or more. Preferably, the time is 5 seconds or more, more preferably 15 seconds or more.

If the heating and holding time is too long, the amount of retained austenite decreases and the uniform ductility falls, further, the tempered martensite excessively softens and the yield strength and tensile strength fall, and, further, hard fresh martensite is formed and the, local ductility falls and the yield strength falls, so the heating and holding time is preferably 96 hours or less. More preferably, the time is 48 hours or less, still more preferably 24 hours or less.

The heating and holding time is suitably adjusted in accordance with the heating temperature. For example, if the heating temperature is 400 to 600° C., the heating and holding time is preferably 20 minutes or less. More preferably, it is 6 minutes or less, still more preferably less than 3 minutes. From the point of productivity, the heating temperature is preferably over 400° C. and the heating and holding time is preferably 20 minutes or less.

Note that, after the two-stage heat treatment of the steel sheet, the steel sheet may be temper rolled to correct the flatness of the steel sheet. Further, the steel sheet may be formed with a coating oil or film for lubrication action.

The sheet thickness of the steel sheet of the present invention is not particularly limited to a specific range, but in the general use sheet thickness 0.8 to 2.3 mm steel sheets, the effect of the two-stage heat treatment remarkably appear.

EXAMPLES

Next, examples of the present invention will be explained, but the conditions of the examples are just single illustrations of conditions employed for confirming the workability and advantageous effects of the present invention. The present invention is not limited to the single illustrations. The present invention can employ various conditions so long as not departing from the gist of the present invention and achieving the object of the present invention.

Example 1

A vacuum melting furnace was used to cast molten steel to produce Steels A to U having the chemical compositions shown in Table 1. The $Ac_1$ point and $Ac_3$ point in Table 1 were found from the changes in heat expansion when heating cold rolled steel sheets of Steels A to P by 2° C./s. The Steels A to U were heated to 1200° C. and held there for 60 minutes, then were hot rolled under the hot rolling conditions shown in Tables 2-1 and 2-2.

TABLE 1

| Steel | Chemical composition (mass %) (balance: Fe and impurities) | | | | | | | | | $Ac_1$ point (° C.) | $Ac_3$ point (° C.) |
| --- | --- | --- | --- | --- | --- | --- | --- | --- | --- | --- | --- |
| | C | Si | Mn | P | S | sol. Al | N | B | Others | | |
| A | 0.235 | 1.46 | 2.12 | 0.005 | 0.0008 | 0.046 | 0.0022 | 0 | | 732 | 838 |
| B | 0.211 | 0.21 | 2.26 | 0.006 | 0.0011 | 0.045 | 0.0024 | 0 | | 697 | 785 |
| C | 0.188 | 1.82 | 2.53 | 0.005 | 0.0012 | 0.046 | 0.0034 | 0 | | 738 | 853 |
| D | 0.175 | 1.24 | 0.82 | 0.005 | 0.0012 | 0.047 | 0.0036 | 0 | | 742 | 884 |
| E | 0.191 | 1.61 | 2.88 | 0.005 | 0.0011 | 0.045 | 0.0033 | 0 | Ti: 0.012 | 715 | 846 |
| F | 0.183 | 1.37 | 2.85 | 0.006 | 0.0009 | 0.048 | 0.0027 | 0 | Nb: 0.018 | 713 | 835 |
| G | 0.202 | 1.50 | 2.54 | 0.005 | 0.0008 | 0.046 | 0.0035 | 0.0019 | Ti: 0.025 | 716 | 854 |
| H | 0.227 | 1.32 | 2.06 | 0.004 | 0.0008 | 0.045 | 0.0026 | 0 | Cu: 0.28 Ni: 0.16 | 728 | 831 |
| I | 0.177 | 1.63 | 2.51 | 0.006 | 0.0008 | 0.047 | 0.0038 | 0 | Cr: 0.52 | 744 | 849 |
| J | 0.182 | 1.65 | 2.70 | 0.005 | 0.0012 | 0.048 | 0.0031 | 0.0015 | Mo: 0.17 | 734 | 846 |
| K | 0.183 | 1.52 | 2.54 | 0.005 | 0.0011 | 0.047 | 0.0026 | 0 | Cr: 0.32 Mo: 0.08 | 735 | 847 |
| L | 0.186 | 1.60 | 2.97 | 0.006 | 0.0012 | 0.046 | 0.0029 | 0 | Ca: 0.0008 Mg: 0.0007 | 729 | 838 |
| M | 0.220 | 1.47 | 2.03 | 0.004 | 0.0011 | 0.045 | 0.0032 | 0 | Bi: 0.0030 REM: 0.0005 | 736 | 848 |
| N | 0.299 | 1.64 | 3.07 | 0.004 | 0.0009 | 0.049 | 0.0025 | 0 | Ti: 0.047 | 717 | 829 |
| O | 0.297 | 1.67 | 2.55 | 0.004 | 0.0008 | 0.048 | 0.0023 | 0 | Cr: 0.55 | 742 | 817 |
| P | 0.365 | 1.83 | 2.76 | 0.004 | 0.0008 | 0.047 | 0.0023 | 0 | | 740 | 810 |
| Q | 0.235 | 1.46 | 2.11 | 0.005 | 0.0010 | 0.046 | 0.0024 | 0.0016 | | 743 | 849 |
| R | 0.190 | 1.81 | 2.54 | 0.006 | 0.0012 | 0.046 | 0.0028 | 0.0015 | | 745 | 858 |
| S | 0.185 | 1.35 | 2.83 | 0.006 | 0.0011 | 0.046 | 0.0025 | 0.0014 | Nb: 0.017 | 727 | 860 |
| T | 0.295 | 1.65 | 3.00 | 0.005 | 0.0009 | 0.048 | 0.0026 | 0.0014 | Ti: 0.045 | 726 | 851 |
| U | 0.175 | 1.64 | 2.51 | 0.006 | 0.0009 | 0.045 | 0.0033 | 0.0014 | Cr: 0.50 | 756 | 861 |

Note)
1. $Ac_1$ point and $Ac_3$ point were found from changes in heat expansion when heating cold rolled steel sheet by 2° C./s.

Specifically, in the temperature region of the Ara point or more, the Steels A to U are rolled by 10 passes to obtain thickness 2.5 to 3.0 mm hot rolled steel sheets. After the hot rolling, water spray was used to cool the hot rolled steel sheets to 500 to 680° C., the cooling end temperature was made the coiling temperature, the hot rolled steel sheets were charged into the electric heating furnace held at that coiling temperature and held there for 60 minutes, then the hot rolled steel sheets were furnace cooled by a 20° C./hr cooling rate down to room temperature to simulate gradual cooling after coiling.

After gradual cooling, the hot rolled steel sheets were pickled to obtain the base materials for cold rolling. These were cold rolled by rolling reductions of 47 to 52% to obtain thickness 1.2 to 1.6 mm cold rolled steel sheets (base steel sheets). A hot dip galvanization simulator was used to heat the base steel sheets by a 10° C./s heating rate up to 650° C., then heat them by a 2° C./s heating rate to the temperatures shown in Tables 2-1 and 2-2 and soak them for 30 to 90 seconds.

After that, the base steel sheets were cooled under the cooling conditions shown in Tables 2-1 and 2-2 down to 460° C. then the base steel sheets were dipped in a hot dip galvanization bath held at 460° C. to hot dip galvanize the base steel sheets. Some of the base steel sheets were heated up to 520° C. to alloy them after the hot dip galvanization.

From the plating temperature (meaning plating bath temperature) or the alloying temperature, the base steel sheets were secondarily cooled under the cooling conditions shown in Tables 2-1 and 2-2. In Tables 2-1 and 2-2, "RT" shows room temperature.

TABLE 2

| | | Hot rolling conditions | | | Annealing conditions | | | | |
|---|---|---|---|---|---|---|---|---|---|
| Test no. | Steel | Sheet thickness after rolling (mm) | Rolling end temp. (° C.) | Coiling temp. (° C.) | Soaking temp. (° C.) | Average cooling rate at 650 to 500° C. temp. region (° C./s) | Alloying | Secondary cooling rate (° C./s) | Secondary cooling stopping temp. (° C.) |
| 1 | A | 2.5 | 960 | 640 | 850 | 30 | Yes | 12 | RT |
| 2 | A | 2.5 | 960 | 640 | 850 | 30 | Yes | 12 | RT |
| 3 | A | 2.5 | 960 | 640 | 830 | 30 | No | 12 | RT |
| 4 | A | 2.5 | 960 | 640 | 820 | <u>1</u> | Yes | 12 | RT |
| 5 | B | 3 | 900 | 500 | 790 | 4 | Yes | 14 | RT |
| 6 | C | 2.5 | 940 | 680 | 870 | 30 | Yes | 14 | RT |
| 7 | C | 2.5 | 940 | 680 | 870 | 30 | No | 14 | RT |
| 8 | C | 2.5 | 940 | 680 | 870 | 30 | Yes | 14 | RT |
| 9 | C | 2.5 | 940 | 680 | 870 | 30 | No | 14 | RT |
| 10 | C | 2.5 | 940 | 680 | 870 | 30 | Yes | 14 | RT |
| 11 | C | 2.5 | 940 | 680 | 870 | 30 | Yes | 14 | RT |
| 12 | C | 2.5 | 940 | 680 | 870 | 30 | Yes | <u>1</u> | RT |
| 13 | C | 2.5 | 940 | 680 | 870 | 30 | Yes | 14 | 100 |
| 14 | C | 2.5 | 940 | 680 | 870 | 30 | Yes | 14 | RT |
| 15 | C | 2.5 | 940 | 680 | 840 | 30 | Yes | 14 | RT |
| 16 | C | 2.5 | 940 | 680 | 870 | 30 | No | 14 | RT |
| 17 | C | 2.5 | 940 | 680 | 870 | 30 | Yes | 14 | RT |
| 18 | C | 2.5 | 940 | 680 | 820 | <u>1</u> | Yes | 14 | RT |
| 19 | C | 2.5 | 940 | 680 | <u>700</u> | 30 | No | 14 | RT |
| 20 | D | 3 | 960 | 500 | 900 | 4 | Yes | 14 | RT |
| 21 | E | 2.5 | 940 | 600 | 860 | 30 | Yes | 12 | RT |
| 22 | E | 2.5 | 940 | 600 | 860 | 30 | Yes | 12 | RT |
| 23 | E | 2.5 | 940 | 600 | 860 | 30 | Yes | 12 | RT |
| 24 | E | 2.5 | 940 | 600 | 860 | 30 | Yes | 12 | RT |
| 25 | E | 2.5 | 940 | 600 | 840 | 30 | Yes | 12 | RT |
| 26 | E | 2.5 | 940 | 600 | 860 | 30 | No | 12 | RT |
| 27 | F | 2.5 | 940 | 600 | 850 | 20 | Yes | 14 | RT |
| 28 | F | 2.5 | 940 | 600 | 850 | 20 | Yes | 14 | RT |
| 29 | G | 2.5 | 950 | 600 | 870 | 20 | Yes | 14 | RT |
| 30 | G | 2.5 | 950 | 600 | 870 | 20 | Yes | 14 | RT |
| 31 | G | 2.5 | 950 | 600 | 870 | 20 | No | 14 | RT |
| 32 | H | 3 | 950 | 600 | 850 | 30 | No | 14 | RT |
| 33 | I | 2.5 | 960 | 600 | 840 | 30 | Yes | 12 | RT |
| 34 | J | 2.5 | 940 | 550 | 850 | 10 | No | 14 | RT |
| 35 | K | 3 | 960 | 550 | 860 | 10 | Yes | 14 | RT |
| 36 | L | 3 | 940 | 550 | 850 | 30 | Yes | 14 | RT |
| 37 | M | 3 | 950 | 600 | 860 | 30 | Yes | 12 | RT |
| 38 | N | 2.5 | 950 | 640 | 840 | 4 | Yes | 14 | RT |
| 39 | N | 2.5 | 950 | 640 | 840 | 4 | No | 14 | RT |
| 40 | N | 2.5 | 950 | 640 | 840 | 4 | Yes | 14 | RT |
| 41 | N | 2.5 | 950 | 640 | 840 | 4 | Yes | 14 | RT |
| 42 | N | 2.5 | 950 | 640 | 820 | 4 | No | 14 | RT |
| 43 | O | 2.5 | 940 | 640 | 830 | 20 | Yes | 14 | RT |
| 44 | P | 2.5 | 940 | 640 | 830 | 20 | Yes | 14 | RT |
| 45 | P | 2.5 | 940 | 640 | 800 | 4 | Yes | 14 | 100 |
| 46 | Q | 2.5 | 960 | 640 | 860 | 30 | Yes | 12 | RT |
| 47 | R | 2.5 | 940 | 680 | 870 | 10 | Yes | 14 | RT |
| 48 | S | 2.5 | 940 | 600 | 870 | 10 | Yes | 14 | RT |
| 49 | T | 2.5 | 950 | 640 | 860 | 4 | Yes | 14 | RT |
| 50 | U | 2.5 | 960 | 600 | 850 | 30 | Yes | 12 | RT |

Note)
1. "Hot rolling conditions", "Sheet thickness after rolling" column: indicates sheet thickness of hot rolled steel sheet.
2. "Annealing conditions", "Alloying" column: "Yes" indicates alloying performed after hot dip galvanization, while "No" indicates alloying not performed after hot dip galvanization.
3. "Annealing conditions" column: "Secondary cooling rate" means the average cooling rate in the temperature region from the alloying temperature to 300° C. when performing alloying and the average cooling rate in the temperature region from the plating temperature to 300° C. when not performing alloying.
4. "Annealing conditions", "Secondary cooling stopping temperature" column: "RT" indicates room temperature.

TABLE 3

| Test no. | Steel | Temper rolling | Heat treatment conditions | | | |
|---|---|---|---|---|---|---|
| | | | Average heating rate in up to 300° C. temperature region (° C./s) | Average heating rate in 300° C. or more temperature region (° C./s) | Heat treatment temp. (° C.) | Heat treatment time (min) |
| 1 | A | Yes | 3 | 30 | 410 | 0.5 |
| 2 | A | Yes | 3 | <u>3</u> | 450 | 0.5 |
| 3 | A | Yes | 3 | 30 | 420 | 0.5 |
| 4 | A | Yes | 3 | 30 | 410 | 20 |
| 5 | B | Yes | 3 | 30 | 400 | 0.5 |
| 6 | C | Yes | 3 | 30 | 410 | 1.5 |
| 7 | C | Yes | 3 | 30 | 450 | 1.0 |
| 8 | C | Yes | 0.01 | 20 | 320 | 60 |
| 9 | C | <u>No</u> | 3 | 30 | 400 | 1.5 |
| 10 | C | Yes | 3 | - | <u>120</u> | 120 |
| 11 | C | Yes | 3 | 30 | <u>650</u> | 1.0 |
| 12 | C | Yes | 3 | 30 | 400 | 20 |
| 13 | C | Yes | 2 | 20 | 450 | 1.5 |
| 14 | C | Yes | = | = | = | = |
| 15 | C | Yes | <u>3</u> | 30 | 410 | 1.0 |
| 16 | C | Yes | 3 | <u>3</u> | 420 | 0.5 |
| 17 | C | Yes | <u>30</u> | 30 | 380 | 1.0 |
| 18 | C | Yes | <u>3</u> | 30 | 410 | 2.0 |
| 19 | C | Yes | 3 | 30 | 450 | 0.5 |
| 20 | D | Yes | 3 | 30 | 400 | 0.5 |
| 21 | E | Yes | 3 | 30 | 410 | 1.5 |
| 22 | E | <u>No</u> | 3 | 30 | 410 | 1.5 |
| 23 | E | Yes | 3 | - | <u>120</u> | 60 |
| 24 | E | Yes | 3 | <u>3</u> | 400 | 0.5 |
| 25 | E | Yes | 3 | 30 | 410 | 1.0 |
| 26 | E | Yes | <u>30</u> | 30 | 420 | 1.0 |
| 27 | F | Yes | <u>3</u> | 30 | 380 | 1.5 |
| 28 | F | Yes | 3 | 30 | <u>620</u> | 2.0 |
| 29 | G | Yes | 3 | 30 | 380 | 1.0 |
| 30 | G | Yes | 3 | 30 | 410 | 0.5 |
| 31 | G | Yes | 3 | <u>3</u> | 380 | 0.5 |
| 32 | H | Yes | 3 | 30 | 410 | 0.5 |
| 33 | I | Yes | 3 | 30 | 350 | 0.5 |
| 34 | J | Yes | 3 | 30 | 380 | 1.5 |
| 35 | K | Yes | 3 | 30 | 410 | 1.0 |
| 36 | L | Yes | 3 | 30 | 410 | 1.5 |
| 37 | M | Yes | 3 | 30 | 350 | 0.5 |
| 38 | N | Yes | 0.01 | 20 | 320 | 180 |
| 39 | N | Yes | <u>30</u> | 30 | 420 | 1.5 |
| 40 | N | <u>No</u> | 2 | 20 | 400 | 1.5 |
| 41 | N | Yes | 3 | - | <u>120</u> | 180 |
| 42 | N | Yes | 3 | 30 | 410 | 0.5 |
| 43 | O | Yes | 3 | 30 | 350 | 1.5 |
| 44 | P | Yes | 3 | 30 | 420 | 1.0 |
| 45 | P | Yes | 2 | 20 | 410 | 1.0 |
| 46 | Q | Yes | 3 | 30 | 410 | 0.5 |
| 47 | R | Yes | 0.01 | 20 | 320 | 60 |
| 48 | S | Yes | 3 | 30 | 380 | 1.5 |
| 49 | T | Yes | 0.01 | 20 | 320 | 180 |
| 50 | U | Yes | 3 | 30 | 350 | 0.5 |

Note)
1. "Temper rolling" column: "Yes" indicates temper rolling performed, while "No" indicates temper rolling not performed.
2. "Heat treatment conditions" column: "—" indicates heat treatment not performed.
3. "Heat treatment conditions", "Average heating rate in 300° C. or more temperature region" column: "-" indicates heat treatment temperature was 300° C. or less.

The secondarily cooled base steel sheets were temper rolled by a 0.50% elongation rate, then were heat treated under the heat treatment conditions shown in Tables 3-1 and 3-2 to obtain hot dip galvanized steel sheet or hot dip galvannealed steel sheet (below, hot dip galvanized steel sheet and hot dip galvannealed steel sheet referred to all together as "plated steel sheet".)

When making the stopping temperature of the secondary cooling 100° C., temper rolling was performed without cooling down to room temperature after stopping the secondary cooling, then heat treatment was performed under the heat treatment conditions shown in Tables 3-1 and 3-2 without cooling down to room temperature. For some of the base steel sheets, the temper rolling or heat treatment was omitted. In the "Heat treatment conditions" column of Tables 3-1 and 3-2, "-" indicates no heat treatment performed.

An XRD measurement use test piece was taken from a plated steel sheet and the rolled surface of the test piece was chemical-polished down to a depth position of ¼ of the sheet thickness from the boundary of the base steel sheet and plating layer. The rolled surface was subjected to an X-ray diffraction test to measure the volume ratio of the retained austenite and the amount of C of the retained austenite.

Specifically, the test piece was irradiated with Mo—Kα rays to measure the integrated strengths of the α phase (200), (211) diffraction peaks and the integrated strength of the γ phase (200), (220), (311) diffraction peaks and find the volume ratio of retained austenite.

Further, Fe—Kα rays were fired to find the lattice constant (aγ) of austenite from the positions of the γ phase (200), (220), (311) diffraction peaks. The amount of C of the retained austenite (Cγ) was calculated using the relationship of aγ(Å)=3.578+0.033×Cγ(mass %).

Further, an EBSP measurement use test piece was taken from a plated steel sheet, a longitudinal section parallel to the rolling direction was electrolytic-polished, then the metal structure at a depth position of ¼ of the sheet thickness of the base steel sheet from the boundary of the base steel sheet and plating layer was observed and the prior austenite grain boundaries were confirmed. Next, FIB was used to fabricate a 3DAP measurement use pin sample including prior austenite grain boundaries.

A 3DAP was used to measure the distributions of concentrations of C, B, and P atoms, find the amount of segregation of C ($[C]_{\gamma gb}$), the amount of segregation of B ($[B]_{\gamma gb}$), and the amount of segregation of P ($[P]_{\gamma gb}$) at the prior austenite grain boundaries, and calculate $[C]_{\gamma gb}/[P]_{\gamma gb}$ and $[B]_{\gamma gb}/[P]_{\gamma gb}$.

Further, a test piece for SEM observation use was taken from a plated steel sheet, a longitudinal section of the test piece parallel to the rolling direction was polished, then this longitudinal section was corroded by Nital corrosion and LePera corrosion and the metal structure at a depth position of ¼ of the sheet thickness of the base steel sheet from the boundary of the base steel sheet and plating layer was observed. Image processing was used to measure the volume ratios of the tempered martensite, polygonal ferrite, fresh martensite, and remaining structure.

The volume ratio of the fresh martensite was found by subtracting the volume ratio of the retained austenite measured by the above XRD measurement from the total of the retained austenite and fresh martensite measured by LePera corrosion.

The yield stress (YS), tensile strength (TS), and uniform elongation (UE1) were found by taking from the plated steel sheets JIS No. 5 tensile test pieces along a direction perpendicular to the rolling direction and performing tensile tests on the test pieces.

The tensile rate was made 1 mm/min until reaching the yield point and then 10 mm/min.

The yield ratio (YR) was found by dividing YS by TS. The total elongation (TE1) and the local elongation (LE1) are values obtained by taking JIS No. 5 tensile test pieces along the direction perpendicular to the rolling direction, conducting tensile tests, and using the measured value of the total elongation ($TE1_0$) and the measured value of the uniform elongation (UE1) to find converted values corresponding to the case of the sheet thickness of 1.2 mm based on the above formulas (1) and (2).

Further, V-notch subsize Charpy impact test pieces were taken from the plated steel sheets in a direction perpendicular to the rolling direction. If the sheet thickness was 1.2 mm, eight sheets were stacked screwed together and if the sheet thickness was 1.6 mm, six sheets were stacked and screwed together. These test pieces were used for performing Charpy impact tests. The Charpy impact value in the case of the test temperature of −60° C. was designated as $IV_{LT}$, the Charpy impact value in the case of the test temperature of 40° C. was designated as $IV_{HT}$, and the value of $IV_{LT}/IV_{HT}$ was found.

If the YR was 0.59 or more, TS×UE1 was 10000 MPa·% or more, and TS×LE1 was 5000 MPa·% or more, it was judged that the mechanical properties were excellent. Further, if $IV_{LT}/IV_{HT}$ was over 0.50, it was judged that the low temperature impact property was excellent.

Tables 4-1 and 4-2 show the results of examination of the metal structures of the plated steel sheets, while Tables 5-1 and 5-2 show the results of evaluation of the mechanical properties and low temperature impact property of the plated steel sheets.

TABLE 4

| | | | Metal structure of plated steel sheet | | | | | | |
|---|---|---|---|---|---|---|---|---|---|
| Test no. | Steel | Thickness of plated steel sheet (mm) | Retained austenite volume ratio (%) | Tempered martensite volume ratio (%) | Polygonal ferrite volume ratio (%) | Fresh martensite volume ratio (%) | Amount of C of retained austenite | $[C]\gamma gb/ [P]\gamma gb$ | $[B]\gamma gb/ [P]\gamma gb$ |
| 1 | A | 1.2 | 12.0 | 24.8 | 6.3 | 0.5 | 1.02 | 6.5 | — |
| 2 | A | 1.2 | 10.8 | 22.3 | 6.0 | 0.6 | 1.08 | 3.6 | — |
| 3 | A | 1.2 | 13.1 | 22.0 | 7.7 | 0.4 | 1.03 | 6.5 | — |
| 4 | A | 1.2 | 4.3 | 3.9 | 56.0 | 1.8 | 0.92 | — | — |
| 5 | B | 1.6 | 0.7 | 37.9 | 11.4 | 2.0 | 0.69 | 6.3 | — |
| 6 | C | 1.2 | 7.5 | 56.3 | 3.6 | 0.4 | 0.87 | 6.3 | — |
| 7 | C | 1.2 | 7.3 | 56.5 | 3.2 | 0.3 | 0.89 | 4.8 | — |
| 8 | C | 1.2 | 6.0 | 56.2 | 3.3 | 0.3 | 1.06 | 9.7 | — |
| 9 | C | 1.2 | 6.3 | 55.0 | 4.1 | 2.3 | 0.83 | 4.0 | — |
| 10 | C | 1.2 | 8.8 | ≤0.1 | 2.2 | 56.1 | 0.64 | 3.9 | — |
| 11 | C | 1.2 | 4.0 | 56.6 | 2.9 | 3.7 | 0.66 | 2.9 | — |
| 12 | C | 1.2 | 4.1 | 52.5 | 4.0 | 3.2 | 0.75 | 5.0 | — |
| 13 | C | 1.2 | 11.2 | 50.1 | 3.0 | 1.9 | 0.87 | 4.6 | — |
| 14 | C | 1.2 | 8.5 | ≤0.1 | 3.3 | 56.7 | 0.59 | 3.8 | — |
| 15 | C | 1.2 | 8.2 | 57.2 | 6.4 | 0.4 | 0.89 | 6.0 | — |
| 16 | C | 1.2 | 8.0 | 57.0 | 3.5 | 0.4 | 0.88 | 3.3 | — |
| 17 | C | 1.2 | 7.2 | 55.4 | 3.5 | 0.4 | 0.87 | 3.2 | — |
| 18 | C | 1.2 | 4.6 | 9.2 | 41.1 | 3.2 | 0.88 | — | — |
| 19 | C | 1.2 | ≤0.1 | ≤0.1 | 81.3 | ≤0.1 | — | — | — |
| 20 | D | 1.6 | 3.2 | 24.2 | 13.1 | 2.4 | 0.92 | 5.2 | — |
| 21 | E | 1.2 | 8.3 | 63.7 | 2.1 | 0.6 | 0.87 | 6.3 | — |
| 22 | E | 1.2 | 7.0 | 62.0 | 2.5 | 2.4 | 0.82 | 4.2 | — |
| 23 | E | 1.2 | 8.6 | ≤0.1 | 2.2 | 64.2 | 0.57 | 3.9 | — |
| 24 | E | 1.2 | 7.0 | 64.1 | 1.2 | 0.5 | 0.86 | 3.4 | — |
| 25 | E | 1.2 | 9.1 | 64.0 | 6.2 | 0.3 | 0.87 | 6.5 | — |
| 26 | E | 1.2 | 7.2 | 63.8 | 2.2 | 0.4 | 0.87 | 3.3 | — |

TABLE 4-continued

| Test no. | Steel | Thickness of plated steel sheet (mm) | Retained austenite volume ratio (%) | Tempered martensite volume ratio (%) | Polygonal ferrite volume ratio (%) | Fresh martensite volume ratio (%) | Amount of C of retained austenite | [C]γgb/ [P]γgb | [B]γgb/ [P]γgb |
|---|---|---|---|---|---|---|---|---|---|
| 27 | F | 1.2 | 9.4 | 54.5 | 2.5 | 0.5 | 0.86 | 6.8 | — |
| 28 | F | 1.2 | 4.2 | 54.6 | 2.8 | 3.5 | 0.69 | 3.3 | — |
| 29 | G | 1.2 | 7.5 | 64.4 | 1.3 | 0.4 | 0.88 | 5.3 | 5.8 |
| 30 | G | 1.2 | 9.1 | 65.5 | 3.1 | 0.3 | 0.89 | 5.6 | 6.3 |
| 31 | G | 1.2 | 6.7 | 67.0 | 1.8 | 0.5 | 0.87 | 3.5 | 3.7 |
| 32 | H | 1.6 | 11.9 | 25.2 | 4.2 | 0.7 | 1.00 | 6.5 | — |
| 33 | I | 1.2 | 7.8 | 55.4 | 5.8 | 0.5 | 0.93 | 5.5 | — |
| 34 | J | 1.2 | 11.9 | 65.4 | 0.8 | 0.5 | 0.89 | 5.2 | 5.8 |
| 35 | K | 1.6 | 8.2 | 60.2 | 4.8 | 0.4 | 0.88 | 6.0 | — |
| 36 | L | 1.6 | 8.7 | 57.5 | 5.1 | 0.3 | 0.87 | 6.0 | — |
| 37 | M | 1.6 | 11.6 | 28.8 | 6.9 | 0.2 | 1.08 | 6.3 | — |
| 38 | N | 1.2 | 14.5 | 72.3 | 3.0 | 0.4 | 1.05 | 10.3 | — |
| 39 | N | 1.2 | 15.4 | 70.6 | 3.2 | 0.3 | 0.90 | 3.7 | — |
| 40 | N | 1.2 | 11.4 | 74.0 | 1.7 | 2.3 | 0.79 | 4.2 | — |
| 41 | N | 1.2 | 14.7 | <0.1 | 1.6 | 75.7 | 0.57 | 3.9 | — |
| 42 | N | 1.2 | 16.4 | 68.8 | 3.5 | 0.3 | 0.89 | 6.5 | — |
| 43 | O | 1.2 | 14.7 | 69.2 | 3.6 | 0.5 | 0.88 | 7.0 | — |
| 44 | P | 1.2 | 16.1 | 74.0 | 4.1 | 0.5 | 0.91 | 7.3 | — |
| 45 | P | 1.2 | 22.5 | 55.9 | 2.9 | 1.8 | 0.91 | 6.3 | — |
| 46 | Q | 1.2 | 11.0 | 37.4 | 3.5 | 0.5 | 1.03 | 6.0 | 5.9 |
| 47 | R | 1.2 | 6.2 | 62.5 | 3.5 | 0.4 | 1.03 | 8.2 | 8.2 |
| 48 | S | 1.2 | 8.3 | 66.2 | 1.3 | 0.4 | 0.87 | 6.3 | 6.2 |
| 49 | T | 1.2 | 14.0 | 78.6 | 2.2 | 0.4 | 1.05 | 9.0 | 10.1 |
| 50 | U | 1.2 | 7.4 | 55.8 | 5.5 | 0.6 | 0.97 | 4.8 | 5.1 |

Note)
1. "Metal structure of plated steel sheet" column: "[C]γgb/[P]γgb" indicates ratio of amount of segregation of C at prior austenite grain boundaries to amount of segregation of P at prior austenite grain boundaries, while "[B]γgb/[P]γgb" indicates ratio of amount of segregation of B at prior austenite grain boundaries to amount of segregation of P at prior austenite grain boundaries.
2. In "metal structure of plated steel sheet", "Amount of C of retained austenite" column, "[C]γgb/[P]γgb" column, and "[B]γgb/[P]γgb" column: "—" shows these measurements not performed.

TABLE 5

| Test no. | Steel | YS (MPa) | TS (MPa) | YR | TEl (%) | UEl (%) | LEl (%) | TS × TEl (MPa · %) | TS × UEl (MPa · %) | TS × LEl (MPa · %) | Low temp. impact property of plated steel sheet $IV_{LT}/IV_{HT}$ | Remarks |
|---|---|---|---|---|---|---|---|---|---|---|---|---|
| 1 | A | 746 | 1113 | 0.67 | 22.6 | 16.7 | 5.9 | 25154 | 18587 | 6567 | 0.67 | Inv. ex. |
| 2 | A | 725 | 1099 | 0.66 | 20.1 | 13.9 | 6.2 | 22090 | 15276 | 6814 | 0.33 | Comp. ex. |
| 3 | A | 764 | 1124 | 0.68 | 23.3 | 18.1 | 5.2 | 26189 | 20344 | 5845 | 0.66 | Inv. ex. |
| 4 | A | 455 | 966 | 0.47 | 16.7 | 12.2 | 4.5 | 16132 | 11785 | 4347 | 0.38 | Comp. ex. |
| 5 | B | 569 | 1034 | 0.55 | 11.4 | 6.6 | 4.8 | 11788 | 6824 | 4963 | 0.62 | Comp. ex. |
| 6 | C | 1033 | 1308 | 0.79 | 15.3 | 9.3 | 6.0 | 20012 | 12164 | 7848 | 0.68 | Inv. ex. |
| 7 | C | 1066 | 1316 | 0.81 | 15.3 | 9.2 | 6.1 | 20135 | 12107 | 8028 | 0.66 | Inv. ex. |
| 8 | C | 1013 | 1350 | 0.75 | 14.9 | 9.4 | 5.5 | 20115 | 12690 | 7425 | 0.75 | Inv. ex. |
| 9 | C | 927 | 1305 | 0.71 | 11.1 | 7.5 | 3.6 | 14486 | 9788 | 4698 | 0.51 | Comp. ex. |
| 10 | C | 833 | 1487 | 0.56 | 7.6 | 5.7 | 1.9 | 11301 | 8476 | 2825 | 0.24 | Comp. ex. |
| 11 | C | 724 | 1248 | 0.58 | 10.1 | 6.6 | 3.5 | 12605 | 8237 | 4368 | 0.28 | Comp. ex. |
| 12 | C | 816 | 1236 | 0.66 | 11.0 | 7.5 | 3.5 | 13596 | 9270 | 4326 | 0.56 | Comp. ex. |
| 13 | C | 932 | 1277 | 0.73 | 15.0 | 9.7 | 5.3 | 19155 | 12387 | 6768 | 0.59 | Inv. ex. |
| 14 | C | 782 | 1475 | 0.53 | 7.7 | 5.4 | 2.3 | 11358 | 7965 | 3393 | 0.27 | Comp. ex. |
| 15 | C | 989 | 1285 | 0.77 | 14.9 | 8.7 | 6.2 | 19147 | 11180 | 7967 | 0.65 | Inv. ex. |
| 16 | C | 1038 | 1314 | 0.79 | 15.2 | 9.2 | 6.0 | 19973 | 12089 | 7884 | 0.36 | Comp. ex. |
| 17 | C | 992 | 1272 | 0.78 | 15.3 | 9.5 | 5.8 | 19462 | 12084 | 7378 | 0.38 | Comp. ex. |
| 18 | C | 669 | 1154 | 0.58 | 11.9 | 8.2 | 3.7 | 13733 | 9463 | 4270 | 0.43 | Comp. ex. |
| 19 | C | 536 | 838 | 0.64 | 17.4 | 10.8 | 6.6 | 14581 | 9050 | 5531 | 0.88 | Comp. ex. |
| 20 | D | 533 | 951 | 0.56 | 17.5 | 12.8 | 4.7 | 16643 | 12173 | 4470 | 0.66 | Comp. ex. |
| 21 | E | 1028 | 1318 | 0.78 | 15.3 | 9.2 | 6.1 | 20165 | 12126 | 8040 | 0.67 | Inv. ex. |
| 22 | E | 878 | 1330 | 0.66 | 11.0 | 7.4 | 3.6 | 14630 | 9842 | 4788 | 0.53 | Comp. ex. |
| 23 | E | 772 | 1485 | 0.52 | 8.4 | 6.1 | 2.3 | 12474 | 9059 | 3416 | 0.25 | Comp. ex. |
| 24 | E | 1079 | 1332 | 0.81 | 13.6 | 7.6 | 6.0 | 18115 | 10123 | 7992 | 0.36 | Comp. ex. |
| 25 | E | 1048 | 1327 | 0.79 | 15.0 | 8.9 | 6.1 | 19905 | 11810 | 8095 | 0.69 | Inv. ex. |
| 26 | E | 993 | 1307 | 0.76 | 15.8 | 9.7 | 6.1 | 20651 | 12678 | 7973 | 0.27 | Comp. ex. |
| 27 | F | 984 | 1295 | 0.76 | 16.1 | 9.8 | 6.3 | 20850 | 12691 | 8159 | 0.70 | Inv. ex. |
| 28 | F | 715 | 1233 | 0.58 | 10.4 | 6.6 | 3.8 | 12823 | 8138 | 4685 | 0.29 | Comp. ex. |
| 29 | G | 975 | 1266 | 0.77 | 15.0 | 8.6 | 6.4 | 18990 | 10888 | 8102 | 0.70 | Inv. ex. |
| 30 | G | 938 | 1250 | 0.75 | 16.2 | 10.0 | 6.2 | 20250 | 12500 | 7750 | 0.73 | Inv. ex. |
| 31 | G | 1037 | 1295 | 0.80 | 14.1 | 7.9 | 6.2 | 18260 | 10231 | 8029 | 0.39 | Comp. ex. |

TABLE 5-continued

| | | | | | | | | | | Low temp. impact property of plated steel sheet $IV_{LT}/IV_{HT}$ | |
|---|---|---|---|---|---|---|---|---|---|---|---|
| | | | | | Mechanical properties of plated steel sheet | | | | | | |
| Test no. | Steel | YS (MPa) | TS (MPa) | YR | TEl (%) | UEl (%) | LEl (%) | TS × TEl (MPa · %) | TS × UEl (MPa · %) | TS × LEl (MPa · %) | Remarks |
| 32 | H | 725 | 1115 | 0.65 | 22.6 | 16.7 | 5.9 | 25199 | 18621 | 6579 | 0.65 | Inv. ex. |
| 33 | I | 932 | 1260 | 0.74 | 15.4 | 9.2 | 6.2 | 19404 | 11592 | 7812 | 0.63 | Inv. ex. |
| 34 | J | 1056 | 1320 | 0.80 | 13.6 | 7.8 | 5.8 | 17952 | 10296 | 7656 | 0.67 | Inv. ex. |
| 35 | K | 960 | 1280 | 0.75 | 14.9 | 9.4 | 5.5 | 19072 | 12032 | 7040 | 0.62 | Inv. ex. |
| 36 | L | 971 | 1294 | 0.75 | 15.6 | 9.3 | 6.3 | 20186 | 12034 | 8152 | 0.61 | Inv. ex. |
| 37 | M | 730 | 1090 | 0.67 | 22.7 | 16.2 | 6.5 | 24743 | 17658 | 7085 | 0.64 | Inv. ex. |
| 38 | N | 1183 | 1556 | 0.76 | 14.0 | 9.7 | 4.3 | 21784 | 15093 | 6691 | 0.74 | Inv. ex. |
| 39 | N | 1179 | 1512 | 0.78 | 14.9 | 10.5 | 4.4 | 22529 | 15876 | 6653 | 0.30 | Comp. ex. |
| 40 | N | 984 | 1492 | 0.66 | 9.8 | 6.6 | 3.2 | 14622 | 9847 | 4774 | 0.53 | Comp. ex. |
| 41 | N | 938 | 1675 | 0.56 | 7.5 | 5.6 | 1.9 | 12563 | 9380 | 3183 | 0.20 | Comp. ex. |
| 42 | N | 1202 | 1522 | 0.79 | 13.6 | 9.7 | 3.9 | 20699 | 14763 | 5936 | 0.63 | Inv. ex. |
| 43 | O | 1183 | 1498 | 0.79 | 14.3 | 10.2 | 4.1 | 21421 | 15280 | 6142 | 0.67 | Inv. ex. |
| 44 | P | 1214 | 1557 | 0.78 | 15.6 | 11.7 | 3.9 | 24289 | 18217 | 6072 | 0.67 | Inv. ex. |
| 45 | P | 1092 | 1517 | 0.72 | 17.5 | 13.8 | 3.7 | 26548 | 20935 | 5613 | 0.61 | Inv. ex. |
| 46 | Q | 804 | 1165 | 0.69 | 19.7 | 13.3 | 6.4 | 22951 | 15495 | 7456 | 0.74 | Inv. ex. |
| 47 | R | 1056 | 1372 | 0.77 | 15.0 | 8.8 | 6.2 | 20580 | 12074 | 8506 | 0.79 | Inv. ex. |
| 48 | S | 1033 | 1324 | 0.78 | 14.7 | 7.9 | 6.8 | 19463 | 10460 | 9003 | 0.73 | Inv. ex. |
| 49 | T | 1194 | 1571 | 0.76 | 13.7 | 8.9 | 4.8 | 21523 | 13982 | 7541 | 0.80 | Inv. ex. |
| 50 | U | 936 | 1265 | 0.74 | 15.4 | 8.7 | 6.7 | 19481 | 11006 | 8476 | 0.68 | Inv. ex. |

Note
1. "Mechanical properties of plated steel sheet" columns: "TEl" indicates total elongation converted to sheet thickness 1.2 mm equivalent, "UEl" indicates uniform elongation, and "LEl" indicates local elongation converted to sheet thickness 1.2 mm equivalent. "IVLT/IVHT" indicates ratio of impact value at −60° C. and impact value at 40° C.

In Tables 4-1 and 4-2, in the column of the "Amount of C of retained austenite (mass %)", the column of "$[C]_{\gamma gb}/[P]_{\gamma gb}$", and the column of "$[B]_{\gamma gb}/[P]_{\gamma gb}$", "-" indicates the amount of C of the retained austenite, $[C]_{\gamma gb}/[P]_{\gamma gb}$, and $[B]_{\gamma gb}/[P]_{\gamma gb}$ are not measured.

Note that, in Table 1 to Table 5, the underlined numerical values or symbols mean outside the scope of the present invention.

The invention examples all exhibited a TS×UEl of 10000 or more, a TS×LEl of 5000 or more, and excellent uniform ductility and local ductility. Further, YR exhibited a high value of 0.59 or more. Further, $IV_{LT}/IV_{HT}$ exhibited a high value of 0.51 or more.

The test results for the comparative examples where the chemical composition or steps and conditions were not suitable were all inferior in part or all of the yield ratio, uniform ductility, local ductility, and low temperature impact property.

Specifically, in Test Nos. 9, 22, and 40 using the Steels C, E, and N having chemical compositions in the scope of the present invention, but not performing temper rolling, the amount of C of the retained austenite is low and TS×UEl and TS×LEl are low. In Test Nos. 10, 23, and 41 having too low a heat treatment temperature, the volume ratio of the tempered martensite, the amount of C of the retained austenite, and $[C]_{\gamma gb}/[P]_{\gamma gb}$ are low and YR, TS×UEl, TS×LEl, and $IV_{LT}/IV_{HT}$ are low. In the test using the Steel C (Test No. 14), heat treatment is not performed, so the volume ratio of the tempered martensite, the amount of C of the retained austenite, and $[C]_{\gamma gb}/[P]_{\gamma gb}$ are low and YR, TS×UEl, TS×LEl, and $IV_{LT}/IV_{HT}$ are low.

In the tests using the Steel C and the Steel F (Test Nos. 11 and 28), the heat treatment temperature is too high, so the volume ratio of the retained austenite, the amount of C of the retained austenite, and $[C]_{\gamma gb}/[P]_{\gamma gb}$ are low and YR, TS×UEl, TS×LEl, and $IV_{LT}/IV_{HT}$ are low.

In Test No. 19 using the Steel C having a chemical composition within the scope of the present invention, but having too low a soaking temperature in the annealing step, the volume ratio of the retained austenite and the volume ratio of the tempered martensite are low and the TS×UEl is low.

In the tests using the Steels A and C (Test Nos. 4 and 18), the average cooling rate in the temperature region of 650 to 500° C. in the first cooling step is too low. In Test No. 4, the volume ratio of the retained austenite and the volume ratio of the tempered martensite are low and the YR and TS×LEl are low. In Test No. 18, the volume ratio of the retained austenite is low and YR, TS×UEl, and TS×LEl are low.

In Test No. 12 using steel C having a chemical composition within the scope of the present invention, but having too low an average cooling rate in the temperature region of the alloying temperature to 300° C. in the second cooling step (secondary cooling rate), the volume ratio of the retained austenite and the amount of C of the retained austenite is low and TS×UEl and TS×LEl are low.

In the tests using the Steels C, E, and N (Test Nos. 17, 26, and 39), the average heating rate in the temperature region up to 300° C. in the two-stage heat treatment step is too high, so $[C]_{\gamma gb}/[P]_{\gamma gb}$ is low and $IV_{LT}/IV_{HT}$ is low.

In the tests using the Steels A, C, E, and G (Test Nos. 2, 16, 24, and 31), the average heating rate in the temperature region over 300° C. in the two-stage heat treatment step is too low, so $[C]_{\gamma gb}/[P]_{\gamma gb}$ is low and $IV_{LT}/IV_{HT}$ is low.

In Test No. 5 using the Steel B, the amount of Si in the steel is small, so the volume ratio of the retained austenite and the amount of C of the retained austenite are low and the YR, TS×UEl, and TS×LEl are low, while in Test No. 20 using the Steel D, the amount of Mn in the steel is small, so the volume ratio of the retained austenite is low and YR and TS×LEl are low.

INDUSTRIAL APPLICABILITY

As explained above, according to the present invention, it is possible to provide hot dip galvanized steel sheet and hot dip galvannealed steel sheet which are excellent in both uniform ductility and local ductility, excellent in press formability, and high in yield strength and tensile strength and which are excellent in local ductility, excellent in impact adsorption, and excellent in low temperature impact property.

The hot dip galvanized steel sheet and hot dip galvannealed steel sheet of the present invention are steel sheets optimal as base steel sheets of member or pillars or other structural parts of auto bodies or other machine structure parts. Therefore, the present invention is high in applicability in the automotive industry and machine part manufacturing industry.

The invention claimed is:

1. A hot dip galvanized steel sheet having a hot dip galvanized layer on the surface,
   a chemical composition of the steel sheet comprising, by mass %,
   C: 0.03 to 0.70%,
   Si: 0.25 to 2.50%,
   Mn: 1.00 to 5.00%,
   P: 0.0005 to 0.100%,
   S: 0.010% or less,
   sol. Al: 0.001 to 2.500%,
   N: 0.020% or less,
   B: 0 to 0.0200%,
   Ti: 0 to 0.30%,
   Nb: 0 to 0.30%,
   V: 0 to 0.30%,
   Cr: 0 to 2.00%,
   Mo: 0 to 2.00%,
   Cu: 0 to 2.00%,
   Ni: 0 to 2.00%,
   Ca: 0 to 0.010%,
   Mg: 0 to 0.010%,
   REM: 0 to 0.10%,
   Bi: 0 to 0.050% and
   a balance of Fe and unavoidable impurities,
   a metal structure of the steel sheet comprising, by volume %, retained austenite: over 5.0% and tempered martensite: over 5.0% and the retained austenite contains C: 0.85 mass % or more, and
   a ratio $[C]_{\gamma gb}/[P]_{\gamma gb}$ of an amount of segregation of C (number of atoms/nm$^2$): $[C]_{\gamma gb}$ to an amount of segregation of P (number of atoms/nm$^2$): $[P]_{\gamma gb}$ at prior austenite grain boundaries in the metal structure of the steel sheet being 4.0 or more.

2. The hot dip galvanized steel sheet according to claim 1, wherein
   a chemical composition of the steel sheet comprises, by mass %, at least one of
   B: 0.0002 to 0.0200%,
   Ti: 0.001 to 0.30%,
   Nb: 0.001 to 0.30%,
   V: 0.001 to 0.30%,
   Cr: 0.001 to 2.00%,
   Mo: 0.001 to 2.00%,
   Cu: 0.001 to 2.00%,
   Ni: 0.001 to 2.00%,
   Ca: 0.0001 to 0.010%,
   Mg: 0.0001 to 0.010%,
   REM: 0.0001 to 0.10%, and
   Bi: 0.0001 to 0.050%.

3. The hot dip galvanized steel sheet according to claim 2, wherein
   in the chemical composition of the steel sheet, a content of B is 0.0002% or more, and
   a ratio $[B]_{\gamma gb}/[P]_{\gamma gb}$ of an amount of segregation of B (number of atoms/nm$^2$): $[B]_{\gamma gb}$ to an amount of segregation of P (number of atoms/nm$^2$): $[P]_{\gamma gb}$ at prior austenite grain boundaries in the metal structure of the steel sheet is 4.0 or more.

4. The hot dip galvanized steel sheet according to claim 3, wherein the hot dip galvanized layer is a hot dip galvannealed layer.

5. The hot dip galvanized steel sheet according to claim 2, wherein the hot dip galvanized layer is a hot dip galvannealed layer.

6. The hot dip galvanized steel sheet according to claim 1, wherein
   in the chemical composition of the steel sheet, a content of B is 0.0002% or more, and
   a ratio $[B]_{\gamma gb}/[P]_{\gamma gb}$ of an amount of segregation of B (number of atoms/nm$^2$): $[B]_{\gamma gb}$ to an amount of segregation of P (number of atoms/nm$^2$): $[P]_{\gamma gb}$ at prior austenite grain boundaries in the metal structure of the steel sheet is 4.0 or more.

7. The hot dip galvanized steel sheet according to claim 6, wherein the hot dip galvanized layer is a hot dip galvannealed layer.

8. The hot dip galvanized steel sheet according to claim 1, wherein the hot dip galvanized layer is a hot dip galvannealed layer.

9. A method of producing the hot dip galvanized steel sheet according to claim 1,
   the method comprising
   an annealing step of heating a base steel sheet having said chemical composition to a temperature region over an Ac$_1$ point to anneal it,
   a first cooling step of cooling the base steel sheet after the annealing step down to 500° C. or less by an average cooling rate at a temperature region of 650 to 500° C. of 2° C./s or more and less than 100° C./s,
   a plating step of hot dip galvanizing the base steel sheet after the first cooling step,
   a second cooling step of cooling the base steel sheet after the plating step down to less than 300° C. by an average cooling rate at a temperature region of the plating temperature to 300° C. of 2° C./s or more,
   a temper rolling step of temper rolling the base steel sheet after the second cooling step by an elongation rate of 0.10% or more, and
   a two-stage heating treatment step of heating the base steel sheet after the temper rolling step up to 300° C. by an average heating rate in the temperature region up to 300° C. of less than 10° C./s, then heating it by an average heating rate in the temperature region over 300° C. of over 10° C./s up to a temperature region of over 300° C. to 600° C., then holding it at that heating temperature for 1 second or more as heat treatment.

10. A method of producing the hot dip galvannealed steel sheet according to claim 8,
    the method comprising
    an annealing step of heating a base steel sheet of said chemical composition to a temperature region over an Ac$_1$ point to anneal it,
    a first cooling step of cooling the base steel sheet after the annealing step down to 500° C. or less by an average cooling rate at a temperature region of 650 to 500° C. of 2° C./s or more and less than 100° C./s,
    a plating step of hot dip galvanizing the base steel sheet after the first cooling step, an alloying step of alloying the base steel sheet after the plating step, a second cooling step of cooling the base steel sheet after the alloying step down to less than 300° C. by an average cooling rate at a temperature region of the alloying temperature to 300° C. of 2° C./s or more, a temper rolling step of temper rolling the base steel sheet after the second cooling step by an elongation rate of 0.10% or more, and a two-stage heating treatment step of heating the base steel sheet after the temper rolling step up to 300° C. by an average heating rate in the temperature region up to 300° C. of less than 10° C./s, then heating it by an average heating rate in the temperature region over 300° C. of over 10° C./s to a temperature region of over 300° C. to 600° C., then holding at that heating temperature for 1 second or more as heat treatment.

* * * * *